United States Patent
Gerig

(10) Patent No.: US 7,523,237 B2
(45) Date of Patent: Apr. 21, 2009

(54) METHOD AND PROTOCOL FOR DIAGNOSTICS OR ARBITRARILY COMPLEX NETWORKS OF DEVICES

(75) Inventor: Michael L. Gerig, Kokomo, IN (US)

(73) Assignee: Delphi Tecnhologies, Inc., Troy, MI (US)

( * ) Notice: Subject to any disclaimer, the term of this patent is extended or adjusted under 35 U.S.C. 154(b) by 309 days.

(21) Appl. No.: 11/098,143

(22) Filed: Mar. 31, 2005

(65) Prior Publication Data

US 2005/0251604 A1 Nov. 10, 2005

Related U.S. Application Data

(60) Provisional application No. 60/558,450, filed on Apr. 1, 2004.

(51) Int. Cl.
G06F 15/16 (2006.01)
G06F 13/42 (2006.01)
G06F 13/368 (2006.01)

(52) U.S. Cl. ............... 710/105; 710/120; 709/228; 709/230

(58) Field of Classification Search ........... 710/120, 710/105; 709/230, 228; 708/228
See application file for complete search history.

(56) References Cited

U.S. PATENT DOCUMENTS

| | | | | |
|---|---|---|---|---|
| 6,003,084 | A * | 12/1999 | Green et al. | 709/227 |
| 6,243,778 | B1 * | 6/2001 | Fung et al. | 710/113 |
| 6,360,145 | B1 * | 3/2002 | Robinson | 701/35 |
| 6,400,729 | B1 * | 6/2002 | Shimadoi et al. | 370/466 |
| 6,529,524 | B1 | 3/2003 | Liao et al. | |
| 6,647,323 | B1 | 11/2003 | Robinson et al. | |
| 6,718,425 | B1 | 4/2004 | Pajakowski et al. | |
| 6,721,859 | B1 * | 4/2004 | Smyers | 711/154 |
| 6,728,603 | B2 * | 4/2004 | Pruzan et al. | 701/1 |

(Continued)

OTHER PUBLICATIONS

European Patent Office Communication for Application No. 05 735 531.5-1244, Dec. 28, 2007 (9 pages).

(Continued)

Primary Examiner—Khanh Dang
Assistant Examiner—Christopher A Daley
(74) Attorney, Agent, or Firm—Jimmy L. Funke

(57) ABSTRACT

The present invention includes a network having a plurality of communication buses, at least two of the plurality of buses utilizing different communication bus protocols; a plurality of computer devices, at least one of the plurality of computer devices coupled to at least one of the plurality of communication buses and containing computer device software having an architecture including bus communication software for communicating with at least one of the plurality of communication buses; and an abstraction layer in communication with the bus communication software and capable of abstracting messages from the communication bus protocols, the plurality of computer devices including at least one gateway computer device coupled to multiple of the plurality of communication buses and containing computer device software having an architecture further including a gateway in communication with the abstraction layer and capable of routing the abstracted messages between computer devices coupled to the multiple communication buses to which the at least one gateway computer device is coupled.

54 Claims, 18 Drawing Sheets

U.S. PATENT DOCUMENTS

| | | | | |
|---|---|---|---|---|
| 6,785,730 | B1 * | 8/2004 | Taylor | 709/230 |
| 6,826,198 | B2 * | 11/2004 | Turina et al. | 370/467 |
| 6,976,080 | B1 * | 12/2005 | Krishnaswamy et al. | 709/230 |
| 7,272,836 | B1 * | 9/2007 | Taylor | 719/328 |
| 7,284,060 | B2 * | 10/2007 | Davison et al. | 709/227 |

OTHER PUBLICATIONS

Patent Cooperation Treaty, "International Preliminary Report on Patentability," for International Application No. PCT/US2005/012626, Oct. 4, 2006 (12 pages).

Petr Cach et al., "IP over CAN," Internet-Draft, Mar. 2001 (11 pages), Section 10 of RFC2026, Internet Engineering Task Force (IETF), The Internet Society, Czech Republic.

Raimund Muller, "LON—das universelle Netzwerk," Oct. 1991 (8 pages), 2087 Elektronik, No. 22, Munchen, Germany.

T. Socolofsky et al., "A TCP/IP Tutorial," Jan. 1991 (28 pages), Network Working Group, United Kingdom.

Robert Hinden et al., "The DARPA Internet Gateway," Sep. 1982 (44 pages), RFC 823, USA.

J. Postel, "Internet Protocol, DARPA Internet Program, Protocol Specification," Sep. 1981 (49 pages), RFC 791, USA.

* cited by examiner

| MESSAGE SET ID MAPPING FOR ECM MODEL 123 | |
|---|---|
| MESSAGE SET VALUE | MESSAGE SET |
| 0 | ABSTRACTED SELF DISCOVERY PROTOCOL MESSAGES |
| 1 | ABSTRACTED GATEWAY PROTOCOL MESSAGES |
| 2 | <RESERVED FOR GLOBAL STANDARDS> |
| ... | <RESERVED FOR GLOBAL STANDARDS> |
| 16 | <RESERVED FOR GLOBAL STANDARDS> |
| 17 | CARB STANDARD XYZ MESSAGES |
| 18 | DEF SUPPLIER STANDARD MANUFACTURING TEST MESSAGES |
| 19 | DEF SUPPLIER ECM STANDARD MANUFACTURING TEST MESSAGES |
| 20 | DEF SUPPLIER ECM 123 PRODUCT MANUFACTURING TEST MESSAGES |
| 21 | ABC OEM STANDARD MANUFACTURING TEST MESSAGES |
| 22 | ABC OEM ECM 123 STANDARD MANUFACTURING TEST MESSAGES |
| 23 | <UNUSED> |
| ... | <UNUSED> |
| 256 | <UNUSED> |

- 1500(a)(1)
- 1500(a)(2)
- 1500(a)(3)
- 1500(a)(4)
- 1500(a)(5)
- 1500(a)(6)
- 1500(a)(7)
- 1500(a)(8)
- 1500(a)(9)
- 1500(a)(10)
- 1500(a)(11)
- 1500(a)(12)
- 1500(a)(13)
- 1500(a)(14)

B

| MESSAGE SET ID MAPPING FOR RADIO MODEL 456 | |
|---|---|
| MESSAGE SET VALUE | MESSAGE SET |
| 0 | ABSTRACTED SELF DISCOVERY PROTOCOL MESSAGES |
| 1 | ABSTRACTED GATEWAY PROTOCOL MESSAGES |
| 2 | <RESERVED FOR GLOBAL STANDARDS> |
| ... | <RESERVED FOR GLOBAL STANDARDS> |
| 16 | <RESERVED FOR GLOBAL STANDARDS> |
| 17 | DEF SUPPLIER STANDARD MANUFACTURING TEST MESSAGES |
| 18 | DEF SUPPLIER RADIO STANDARD MANUFACTURING TEST MESSAGES |
| 19 | DEF SUPPLIER RADIO 456 PRODUCT MANUFACTURING TEST MESSAGES |
| 20 | ABC OEM STANDARD MANUFACTURING TEST MESSAGES |
| 21 | ABC OEM RADIO 456 STANDARD MANUFACTURING TEST MESSAGES |
| 23 | <UNUSED> |
| ... | <UNUSED> |
| 256 | <UNUSED> |

- 1500(b)(1)
- 1500(b)(2)
- 1500(b)(3)
- 1500(b)(4)
- 1500(b)(5)
- 1500(b)(6)
- 1500(b)(7)
- 1500(b)(8)
- 1500(b)(9)
- 1500(b)(10)
- 1500(b)(11)
- 1500(b)(12)
- 1500(b)(13)

A

| MESSAGE ID MAPPING FOR MESSAGE SET "CARB STANDARD XYZ MESSAGES" | |
|---|---|
| MESSAGE ID VALUE | MESSAGE DEFINITION |
| 0 | GET DTCs = " ..." — 1600(a)(1) |
| 1 | REPORT DTCs = " ..." — 1600(a)(2) |
| 2 | GET LAST SERVICE DATE = " ..." — 1600(a)(3) |
| 3 | SET LAST SERVICE DATE = " ..." — 1600(a)(4) |
| 4 | REPORT LAST SERVICE DATE = " ..." — 1600(a)(5) |
| ... | ... — 1600(a)(6) |
| 256 | ... — 1600(a)(7) |

B

| MESSAGE ID MAPPING FOR MESSAGE SET "DEF SUPPLIER STANDARD MANUFACTURING TEST MESSAGES" | |
|---|---|
| MESSAGE ID VALUE | MESSAGE DEFINITION |
| 0 | GET SOWARE IDs = " ..." — 1600(b)(1) |
| 1 | REPORT SOFTWARE IDs = " ..." — 1600(b)(2) |
| 2 | GET MODEL NUMBER = " ..." — 1600(b)(3) |
| 3 | SET MODEL NUMBER = " ..." — 1600(b)(4) |
| 4 | REPORT MODEL NUMBER = " ..." — 1600(b)(5) |
| ... | ... — 1600(b)(6) |
| 256 | ... — 1600(b)(7) |

FIG. 16

METHOD AND PROTOCOL FOR DIAGNOSTICS OR ARBITRARILY COMPLEX NETWORKS OF DEVICES

This application claims the benefit of U.S. Provisional Patent Application No. 60/558,450, filed on Apr. 1, 2004.

TECHNICAL BACKGROUND

This invention relates to the exchange of data over a network. More specifically, the field of the invention is network communications between embedded and/or non-embedded computer communications devices.

BACKGROUND OF THE INVENTION

Communications Layering in General

Communications between computer devices are often described as a series of layers. The basic philosophy behind layering is that communications can be broken into incremental modules (layers), each of which 1) adds new functionality on top of the functionality available from lower layers, and 2) generally does not dictate functionality in higher layers. Proper layering facilitates substitution of implementations of individual layers without affecting other layers. This allows both flexibility of design and reuse to coexist, which in turn lowers cost, increases reliability, reduces development time, and generally improves customer satisfaction.

A common model used to describe communications layers is the International Standards Organization ("ISO") Open Systems Interconnection ("OSI") model. The OSI model consists of seven (7) layers, each of which defines a portion of the process of moving data across a network. The seven (7) layers include a physical layer, a datalink layer, a network layer, a transport layer, a session layer, a presentation layer and an application layer.

The benefits of layering generally can only be achieved to the degree that different layers are well partitioned and not tightly coupled with one another. By analogy, road networks are better than train networks in terms of the layering principal. Roads have a very simple general-purpose interface (a hard flat surface), which allows a variety of traffic across it including cars, trucks, bulldozers, people, bikes, wildlife, airplanes, etc. The choice to use a road facilitates vehicular travel, and at the same time, the choice rarely restricts which vehicles may be used. Railroads, on the other hand, are basically only good for trains and not much else. Once the decision is made to use a railroad as the lower layer interface, then the train is likely to be the only vehicle that may be used. From a functional growth standpoint, it is much easier to adapt a vehicle to work on a road than to adapt a vehicle to work on a railroad. This same principal applies to computer communications through the concept of layering. Successful layering requires that each layer perform its function well while minimizing the number and degree of restrictions that a given layer forces on higher layers.

SUMMARY OF THE INVENTION

Communications Layering in the Automotive Industry

In the automotive industry, the performance of diagnostic testing on vehicles is important to keeping vehicles functioning properly, important to consumer safety, and important to consumer satisfaction. Automobiles contain numerous computer devices (e.g., sensors, entertainment devices such as radios, engine controllers, body controllers for the control of vehicle components, navigational systems, etc.). These devices typically support the ability to collect, record, and communicate diagnostic information over one or more vehicle networks for the end purposes of ensuring that vehicles function properly and providing consumer safety and consumer satisfaction.

Computer communications in the automotive industry, like in many embedded industries, are often done using specialized communication buses that are optimized for embedded environments. These specialized buses are used to improve performance in areas of concern to the automotive industry, such as power consumption, electromagnetic radiation and immunity, over the level that may be achieved with more general buses (e.g., ethernet). However, the efficiency and optimization gained through the use of these domain-specific communication bus designs tend to come at the expense of poor layering. Typical automotive buses such as Class 2, Controller Area Network ("CAN"), BEAN, Media Oriented Systems Transport ("MOST"), etc. are typically defined as one monolithic standard or a series of tightly coupled standards which cover layers all the way from the physical layer to the application layer. Even in cases where the lower layers (e.g., CAN bus) may be technically separate from upper layers (e.g., a specific vehicle's radio-specific CAN messages), the practical effect on the designers of computers that communicate on the bus is no different from a poorly layered monolithic standard.

As a result of poor layering on the communication buses in the automotive industry, two valuable communications capabilities are not largely provided for in the automotive industry. One is the capability to easily support multiple arbitrary application protocols (or standards) in parallel on the same physical interface while adapting new standards over time. The other is the capability to take application protocols designed for one bus and reuse them on another bus. As a result, two functionally identical devices that communicate on different automotive buses typically have very different application-layer implementations.

Additionally, for several reasons, individual automobiles often contain multiple communication buses of differing types that are physically incompatible. One reason for this occurrence is that communications needs for safety critical components such as engine control, braking, steering, etc. and are very different from communications needs for entertainment devices such as radios. Thus, maintaining within one vehicle multiple physically incompatible communication buses that are optimized to different criteria can often provide cost, functional, or reliability advantages over a single communication bus approach. Another reason is the need to isolate safety critical systems from changes on more open systems such as entertainment where aftermarket and third-party devices are more commonly introduced. A third reason is the need to minimize risk when migrating to new technologies. For example, when upgrading a vehicle entertainment system to newer buses like MOST or 1394 from older lower functionality buses like Class 2, it is favorable to avoid putting safety critical engine control and body control at risk by changing all devices in the vehicle to the new bus when only the entertainment system needs the new functionality.

Diagnostics communications in the automotive industry are a mixture of many incompatible protocols, varying vehicle architectures, and multiple standards groups with varying scopes and competing goals. While variation in the low-level physical methods of communication is important to the cost-optimized provision of consumer features, the present significant variation and incompatibility at the upper communication layers is not inherently beneficial or necessary and comes at significant cost to the companies in the industry and to the consumer.

As has been explained, in the automotive industry, diagnostics communications are more varied and inconsistent than perhaps necessary. By the principal of layering, one should expect to be able to access various nodes in the vehicle for the same information in the same way, without regard to what communication bus the nodes are on (e.g., "does a node have a problem, what versions of software does it have, what is the part and model number," etc.). The application layer, which exchanges this information, should be reused even though the lower layers may be different for good reason. But in reality, one typically has to ask for that information in different ways (i.e., different applications layers) depending on the bus (e.g. Class 2, CAN, etc.) being used to communicate to the device.

Costs of Poor Layering in the Automotive Industry

The combination of multiple communication buses with poor layering results in much inefficiency in the design, development, and performance of vehicle diagnostics in the automotive industry. Engineering costs are incurred within a vehicle design because multiple diagnostic standards must often be supported on the same vehicle. While the cost of different physical bus implementations may be justifiable to obtain different bus capabilities, the software and software quality assurance efforts to support multiple application layers is wasteful.

Additional engineering costs are incurred across multiple vehicles when computer device suppliers and diagnostic tool suppliers must support very different standards for different automobile manufacturers for devices that are otherwise functionally very similar. Less tangible, but nevertheless, real costs are incurred through limitations in functional performance. That different vehicles—and in some cases different modules within different vehicles—require different communications to determine the same information requires extra training for service personnel and increases the likelihood of errors due to complexity and variation.

Standardization Solutions and Accompanying Limitations

The automotive industry has taken several approaches to address the problems of incompatible application-layer communications by standardizing diagnostics. California Air Resources Board (CARB) has defined a series of diagnostics standards, including the most recently passed On-Board Diagnostics II standard (OBD-II). OBD-II defines standard information that must be made available through service diagnostics by vehicles sold in the state of California. OBD-II allows flexibility in the choice of communication bus, allowing a number of buses such as CAN, Class 2, Keyword 2000, etc. to be used to make the physical connection between the automobile and diagnostic tool. Because of the incompatible nature of these buses, however, the application layers differ on each bus. For this reason, to implement OBD-II, CARB and the automotive industry created and implemented a series of specifications that not only define the standard information, but also define how the information is exchanged over each of the specific communication buses. While the former definition is efficient in that it is done once, the latter part is inefficient because it has to be done once for each supported bus. Though CARB succeeded in adding functionality across diverse buses through standardization and legislation, computer device suppliers, diagnostic tool manufacturers and vehicle manufacturers still incur the costs associated with multiple application layer standards on the different buses.

More recently, CARB has adopted a more documentation-efficient and variation-reducing approach by legislating that all vehicles have to use CAN as the communication bus for OBD diagnostics communications. This approach helps to remove the cost of having to support separate application layer variants for each bus, but the approach comes at the tremendous cost of forcing a single communication bus solution on manufacturers, which in many situations may not be most cost-effective for other reasons. A unifying decision has been made through legislation, but at an untold cost to the industry and the end consumer's pocketbook.

The Automotive Multimedia Interface Consortium's (AMIC) struggles in choosing a standard multimedia bus for the automotive industry underscore the need in the industry to preserve the ability to choose different solutions rather than dictate a single solution. Though AMIC spent years trying to establish a single standard for a multimedia bus, AMIC was unable to decide between MOST or IEEE 1394. In the end, AMIC adopted both MOST and IEEE 1394 as standards to allow design flexibility to take advantage of their different strengths and weaknesses in different situations. This is a strong indication that variation in implementation even within a communications class (e.g., high-end multimedia buses) will continue to remain for good reason, let alone the even stronger need for variation across communication classes (e.g. multimedia vs. safety and security buses).

Additionally, the very process and method of traditional communications standardization itself within the automotive industry is problematic. All of the various traditional standardization solutions rely on a central body not only to create the standard, but also to maintain the standard as it grows. This is particularly true in terms of the allocation, documentation, and enforcement of diagnostic messages at the application layer. Because CARB owns OBD-II and standardizes it, if an OEM or supplier needs changes made to or additional functionality added to the OBD-II definition, the party must work through CARB to do so. Similarly, if a supplier needs proprietary diagnostics messages on an original equipment manufacturer (OEM) vehicle bus, the supplier must request a message from the OEM message standards board and are powerless if the OEM message standards board rejects the request. To further complicate matters, standardization processes are typically slow due to the nature of standards committees and the inefficiencies with information exchange between companies with different cultures, goals, and perspectives.

Centrally Controlled Limited Resources in Application Layer

Another problem limiting application-layer compatibility in automotive communications is the prevalence of limited numbers of message identifiers in communication bus protocols. Application-layer communications have an inherent need to unambiguously distinguish different types of information being communicated. Messaging communications typically use separate fields to distinguish between the type of the data being communicated and the data itself. This structure allows a receiving algorithm to first decipher the data type and then use that information to branch to type-specific algorithms to decipher the data itself.

Current application-layer protocols support globally finite numbers of message types based on a finite-length type identification field. In some cases this field has sub-fields, but, nevertheless, the protocol supports only a finite number of message types globally. As features and functions grow and change, new messages need to be defined over time. Current solutions require centralized management of new message definitions for two reasons. First, the limited resource must be spent wisely to allow running out of messages. Second, assignment of type identifiers must be coordinated to avoid conflicting use by independent groups of product designers. This causes inherent conflict between product designers with demand for new messages, and the application-layer standards committees which define and assign those message types. This conflict and its resolution process typically results in lost time, non-optimized messages, and general frustration on the part of both product designer and standards committee members.

A far better situation would be one where there is no competition for a limited resource of message identifiers and where the need for central control of message definition is avoided. This would speed the message definition process and allow product designers to define exactly what they need when they need it. Such a solution does not presently exist and is needed in the art.

The Impact of Telematics

The recent rapid growth of telematics systems (i.e., automobile systems that combine global positioning system satellite tracking and wireless communications for automatic roadside assistance and remote diagnostics) creates further need for solutions to the communication incompatibility problems in the automotive industry. Telematics has added additional connections to the vehicle from which diagnostics can be obtained. Not only is the traditional J1962 under-dash connector for service diagnostics being used, but also wireless wide area network solutions such as OnStar® (OnStar® is a registered trademark of General Motors Corporation of Detroit, Mich.), which typically operate over cellular or sometimes satellite networks, are being used as well. Wireless local area network connection protocols such as Bluetooth and 802.11, which allow short range connection to things such as home networks, gas pumps, toll booths, etc., are also currently being implemented. These changes impact the need for application-layer compatibility in multiple ways.

In one way, the changes created by the use of telematics impact the need for application-layer compatibility because telematics open up the possibility of adding remote diagnostics. The additional telematics connections are different in nature than the traditional J1962 connection. Wireless networks in the automobile are generally geared more towards additional consumer features and functions rather than diagnostics. Therefore, wireless networks are a more appropriate portal through which to provide diagnostics information to consumers than the traditional J1962 connector. The addition of convenient (wireless) consumer-focused external interfaces to the vehicle greatly facilitates the possibility of remote whole-vehicle diagnostics as a saleable function, but the cost and functional performance problems caused by the application-layer communication incompatibilities across the automotive industry currently hamstring the growth of remote whole-vehicle diagnostics.

The changes impact the need for application-layer compatibility in another way as well. Since telematics connections by nature are different connections than the J1962 connection but do not presently replace the J1962 functionality, telematics increases the prevalence of situations where the same diagnostic information needs to be made available over different communication buses within the same vehicle. Essentially by definition, having telematics in a vehicle means that there are presently at least two incompatible application layers over which diagnostics information could potentially be exchanged with the automobile. This is particularly important because solutions like CARB's standardizing on one vehicle bus through legislative process cannot address the need for maintaining connections like J1962 while adding telematics. The industry cannot support seamless cost-effective diagnostics over both interfaces without a solution to unify application-layer communications.

Remote Diagnostics

Device diagnostics is performed in computer device module development, in servicing automobiles, and in complying with the mandated monitoring of emission related components. Device diagnostics can be done in a wired fashion (e.g., Assembly Line Diagnostic Link/J1962 connector), via local wireless network (e.g., 802.11, Bluetooth), or remotely (e.g., cellular, satellite). In many cases, gateway devices provide indirect connectivity to devices on buses other than the bus providing direct access to the outside world, resulting in the need to diagnose an arbitrary depth network of interconnected non-homogeneous buses.

Due to the incompatibilities in application protocols, the variation in vehicle communication network construction and complexity, and the variation in the capabilities of the devices on the network, it is presently costly and difficult to perform whole-vehicle diagnostics. Typically, the algorithms used to access and diagnose particular devices in a vehicle must be designed and implemented on a device-by-device basis, in consideration of the communications protocols and the network topology being used. As a result, diagnosing devices directly accessible over one communication bus to the device itself is common because no gateway and translation activities are necessary. For example, automotive assembly plants typically have the ability to connect to a vehicle communication bus and perform diagnostics on devices directly residing on that bus. The direct remote diagnosis of telematics units within an automobile is also common (e.g., OnStar®) for the same reason.

The indirect diagnosis of sub-devices (i.e., devices only accessible through a gateway device) however, is uncommon and often limited in functionality because current approaches require the gateway device to interpret differing application-layer protocols on both sides of the gateway and implement message-specific algorithms. The software complexity for a gateway device is typically proportional to the amount of diagnostics information that it passes as a gateway. Furthermore, modification of the diagnostics requirements for a device hidden behind a gateway typically requires modification not only to the device being diagnosed, but also to the gateway device itself.

This inability to do indirect network diagnostics through gateways in a consistent and efficient fashion conflicts with the opportunities that telematics bring to support remote diagnostics. With telematics, it should be possible from a consumer perspective to diagnose the whole vehicle in the same way regardless of whether it is being diagnosed in a traditional service bay via J1962 connector, via wireless local area network to a gas pump or toll booth, or via wireless wide area network via a web portal or telematics service center. This is not practical today because of the gateway problem identified above and the fact that the telematics device, unlike the J1962 connector, is by definition a gateway. The telematics box is a gateway between the wireless communication bus connecting to the outside world, and the other diagnosable devices residing on the internally wired vehicle communication buses.

Another problem encountered when diagnosing nodes on a network of interconnected non-homogeneous buses is that the transmission of a message across multiple buses may require that new messages be defined for transmission of the message on any communication bus different from the bus to which the node originating the message is connected. Therefore, depending on the complexity of the network and the number of buses over which a message may have to travel, an extraordinary number of messages may have to be defined. Message definition takes up a lot of time on the application developer side, and the chances of running out of message identifiers on a specific communication bus increases with every newly defined message. It is also worth noting that the need for new message definitions does not always equate to new messages quickly being defined.

Existing solutions in the marketplace allow some indirect remote diagnosis of devices via telematics gateways. For example, services such as OnStar® typically allow remote diagnosis of the airbag system. Because of the gateway problem, however, the remote diagnosis of such systems via telematics is very limited and expensive to engineer.

One existing solution is to hard code the ability to diagnose specific small subsets of information on specific electronic boxes in the vehicle using a-prior knowledge of what can be diagnosed in each box and a-prior knowledge of vehicle network topology. Such systems support diagnosis of specific limited features by providing a feature-specific translation between messages on vehicle buses and messages on the communications path to the telematics service center. These systems do not allow arbitrary diagnosing of the vehicle in a generic sense, and if the network topology changes or the diagnostic messages required of the indirectly diagnosed box change, the telematics box software itself must also be changed.

A slightly more advanced approach is to implement a virtual bus where the telematics box passes vehicle bus information to and from the telematics service center in a traditional protocol "tunneling" fashion. "Tunneling" is a technology enabling a network to send its data via another network's connection. At its basic level, tunneling refers to a user-transparent method of running a first protocol on top of a second protocol. While tunneling methods are known in the art, current tunneling schemes are computation-intensive and slow. Tunneling may be done either with or without filtering. "Filtering" refers to a gateway device's ability to examine each message transmitted on a network and determine whether the message is suitable for transmission over the respective communication bus to which the gateway device is connected.

Tunneling may done with or without filtering. Tunneling without filtering requires that if a specific message is to be transmitted from a first node on a first communication bus to a second node on a second communication bus, then all of the first node's messages must be tunneled over the second communication bus because the specific message is not isolated for transmission. Therefore, tunneling without filtering waste resources on both the first and second communication buses and burdens the second communication bus with unnecessary message traffic. The use of the tunneling technology with filtering is a solution that has been used to overcome these problems.

Tunneling with filtering may be implemented in a couple of different ways. In one implementation, the filtering function may be done at a non-gateway, message-originating node. Accordingly, if a first node on a first communication bus desires to transmit a specific message to a second node on a second communication bus, the first node recognizes the specific message is going to the second node and tunnels only the specific message over the second communication bus instead of flooding the second communication bus with all of its messages.

The provision of the filtering function at the message-originating node creates a couple of problems. First, every time that the message originating node desires to retrieve new information from a node on a communication bus to which the originating node is not connected, the software of that node must be updated to allow such new information to be retrieved. Secondly, when the message originating node sends messages to any node not connected to the communication bus to which the message originating node is connected, the message originating node must send two messages—the first to carry the message and the second to enable the first message to be tunneled over any communication bus necessary to reach the node.

The filtering function may be provided at a gateway node as well, which is also problematic. If a gateway is used to filter messages sent between nodes on the communication buses that the gateway connects, then the gateway must examine the content of every message transmitted on each of the buses to determine where the message should be sent and/or tunneled. Additionally, because a gateway's software is coupled to broad network design requirements, any time that a new feature is added to a node on one of the communication buses that the gateway connects, the software of the gateway must be updated so that it can identify the new feature when examining the node's message content and determining on which bus the message needs to be tunneled to reach its destination. Therefore, depending on how often new features are added to the node or a new node is added to the network, the vendors of the gateway may have to be contacted for software updates on a frequent basis.

The implementation of a tunneling solution avoids hard coding individual messages, but suffers from other practical problems. Differences in bus bandwidth on the two sides of the gateway typically require that message filtering be used to avoid overloading the wireless connection under heavy vehicle bus traffic. Therefore, the telematics software still must have prior knowledge of the capabilities of the indirectly diagnosed boxes in order to perform the filter, and the software may have to change if the indirect diagnostics requirements change. Also, the application layer for diagnostics still varies from vehicle bus to vehicle bus (which requires the telematics service center to support multiple vehicle buses if the indirect boxes being diagnosed reside on different vehicle buses) rather than a single application-layer protocol as should be possible with successful layering.

Diagnostics in the automotive industry can be significantly improved in terms of both cost and functionality to help keep vehicles functioning properly, to improve consumer safety, and to improve consumer satisfaction.

The use of the term "abstracting" herein refers to concealing a message from the specifics of the communication bus protocol of the communication bus over which the message travels, thereby enabling the message to be transmitted over any communication bus implementing any communication bus protocol. The use of the term "abstraction layer" herein refers to a protocol that abstracts anything above it from the layers below it and enables the layers above the abstraction layer to be defined without regard to a specific instance of underlying layer implementations.

In one form of the present invention, a computer data signal is provided, the computer data signal embodied in an electrical signal represented as a plurality of bits for communicating a message over a network including multiple computer devices coupled to at least one communication bus utilizing a communication bus protocol, the computer data signal including a transport portion supporting transport layer functions compatible with the communication bus protocol of the at least one communication bus over which the message is transmitted; and a common transport portion operably connected to the transport portion and supporting transport layer functions, the common transport portion enabling the message to be abstracted from the communication bus protocol.

In another form of the present invention, a software architecture for implementation in at least one of the devices is provided, the software architecture including software capable of communicating with the at least one communication bus; and an abstraction layer in communication with the software, the abstraction layer capable of abstracting a message from the communication bus protocol.

In still another form of the present invention, a computer device is provided, the computer device including at least one hardware circuitry connected to the at least one communication bus; and at least one microprocessor connected to the at least one hardware circuitry, the at least one microprocessor containing software having an architecture including communication software capable of communicating with the at least one communication bus; and an abstraction layer in communication with the communication software, the abstraction layer capable of abstracting a message from the communication bus protocol.

In another form of the present invention, a computer device is provided, the computer device including at least one hardware circuitry connected to the at least one communication bus; and multiple microprocessors connected to the at least one hardware circuitry and containing software having an architecture including communication software capable of communicating with the at least one communication bus; and an abstraction layer in communication with the communication software, the abstraction layer capable of abstracting a message from the communication bus protocol.

In yet another form of the present invention, a method of enabling the computer devices to resolve the message is provided, the message including a message set ID and a message ID, the method including the steps of looking up the message set ID in a message set ID mapping, which maps at least one message set ID to a message set definition for each node, to obtain the message set definition; looking up the message ID in a message ID mapping, which maps at least one message ID to a message definition, to obtain the message definition; and using the message definition to interpret the message.

A network is provided in another form of the present invention, the network including at least one communication bus utilizing a communication bus protocol; and a plurality of computer devices coupled to the at least one communication bus, at least one of the plurality of computer devices containing computer device software having an architecture including communication software for communicating with the at least one communication bus; and an abstraction layer in communication with the communication software and capable of abstracting a message from the communication bus protocol.

In still another form of the present invention, a network includes a plurality of communication buses, at least two of the plurality of buses utilizing different communication bus protocols; a plurality of nodes, at least one of the plurality of nodes coupled to at least one of the plurality of communication buses and containing node software having an architecture including bus communication software for communicating with at least one of the plurality of communication buses; and an abstraction layer in communication with the bus communication software and capable of abstracting messages from the communication bus protocols, the plurality of nodes including at least one gateway node device coupled to multiple of the plurality of communication buses and containing node software having an architecture further including a gateway in communication with the abstraction layer and capable of routing the abstracted messages between nodes coupled to the multiple communication buses to which the at least one gateway node is coupled.

BRIEF DESCRIPTION OF THE DRAWINGS

The above-mentioned features and objects of this invention, and the manner of attaining them, will become more apparent and the invention itself will be better understood by reference to the following description of embodiments of the invention taken in conjunction with the accompanying drawings, wherein:

FIG. 15A is a table illustrating the mapping of global message set identifiers to an ECM node's message set definitions;

FIG. 15B is a table illustrating the mapping of global message set identifiers to a radio node's message set definitions;

FIG. 16A is a table illustrating the mapping of message identifiers to message formats for the "CARB Standard XYZ Messages" message set referred to in FIG. 15A;

FIG. 16B is a table illustrating the mapping of message identifiers to message formats for the "DEF Supplier Standard Manufacturing Test Messages" message set referred to in FIGS. 15A and 15B;

Figure 1:
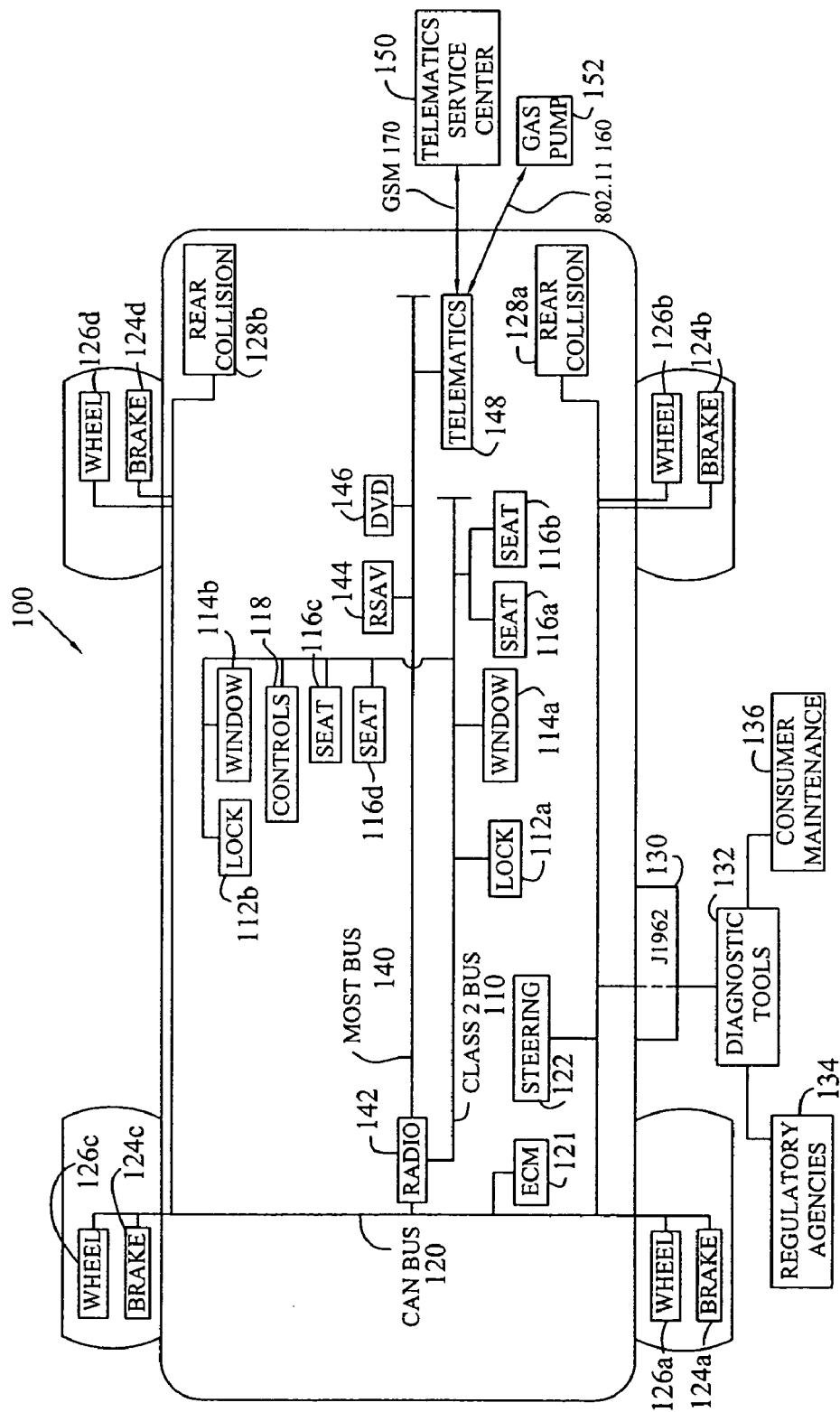
FIG. 1 is a perspective view of a prior art vehicle communication network.

Corresponding reference characters indicate corresponding parts throughout the several views. Although the drawings represent embodiments of the present invention, the drawings are not necessarily to scale and certain features may be exaggerated or simplified in order to better illustrate and explain the present invention. The exemplifications set out herein illustrate embodiments of the invention in several forms and such exemplification is not to be construed as limiting the scope of the invention in any manner.

DESCRIPTION OF INVENTION

The embodiments disclosed below are not intended to be exhaustive or limit the invention to the precise forms disclosed in the following detailed description. Rather, the embodiments are chosen and described so that others skilled in the art may utilize their teachings.

Automotive vehicles contain many electrical components such as circuits, motors, switches, sensors and other devices. Communication networks are provided in vehicles to enable communication among all of the vehicle's components. Communication networks in vehicles also help to provide efficient diagnostics and service functionality.

The use of the term "global" hereinafter refers to the applicability to all nodes coupled to any existing or not-yet existing vehicle communication bus.

The use of the term "layer" hereinafter refers to a software and/or a hardware environment in which a particular protocol operates to enable communication between two (2) or more devices, modules or nodes in a network. As described above, the OSI model provides seven (7) layers (i.e., application layer, presentation layer, session layer, transport layer, network layer, datalink layer and physical layer). Each of the layers has a protocol that enables the layer to perform particular functions in transmitting a message between devices in a network.

The communication networks in automotive vehicles are typically very complex and often comprise multiple communication buses that conform to different data communication protocols (e.g., CAN, Class 2, TTP-C, Bluetooth, IDB-1394, MOST, 802.11b and IDB-C). Communication buses are used to distribute information within a vehicle network, such as network 100 shown in FIG. 1. Vehicle communications network 100 includes Class 2 communication bus 110, CAN communication bus 120 and MOST communication bus 140. Network 100 also includes many computer devices, including lock nodes 112a, 112b; window nodes 114a, 114b; seat nodes 116a, 116b, 116c, 116d; controls node 118; electronic control module 121, steering node 122; brake nodes 124a, 124b, 124c, 124d; wheel nodes 126a, 126b, 126c, 126d; rear collision nodes 128a, 128b; radio node 142; rear-seat audio/video node 144; DVD node 146 and telematics node 148.

Lock nodes 112a, 112b, window nodes 114a, 114b and seat nodes 116a-d are coupled to Class 2 bus 110. Class 2 bus 110 shares radio 142 with CAN bus 120 and MOST bus 140.

Coupled to CAN bus 120 are ECM node 121, steering node 122, wheel nodes 126a-d, brake nodes 124a-d, rear collision nodes 128a, 128b and radio 142. CAN bus 120 shares radio 142 with Class 2 bus 110 and MOST bus 140.

Radio node 142, rear-seat audio/video (RSAV) node 144, DVD node 146 and telematics unit 148 are coupled to MOST bus 140. MOST bus 140 shares radio 142 with Class 2 bus 110 and CAN bus 120.

Vehicle communication network 100 includes several ways for external entities to communicate with network 100. Regulatory agencies 134 and/or consumer maintenance organizations 136 may use diagnostic tool 132 to communicate with network 100. J1962 connector 130 provides a physical interface enabling diagnostic tool 132 to access network 100 over CAN bus 120. Telematics service center 150 may access network 100 by communicating with telematics unit 148 over wireless bus 170 utilizing the Global System for Mobile communications (GSM) protocol. Similarly, gas pump 152 may access network 100 by communicating with telematics unit 148 over wireless bus 160 utilizing the 802.11 protocol.

The hardware of lock node 112a and alternative versions of radio 142 is shown in detail in FIGS. 2A, 2B and 2C. Other nodes in network 100 may have the same or similar hardware components. Lock node 212 includes microprocessor 212a. Microprocessor 212a is in communication with Class 2 bus 110 by way of Class 2 hardware interface circuitry 212c. Lock node 212 may include other hardware 212d coupled to microprocessor 212a that provides any of a variety of functions, e.g., data input/output.

Alternative versions of radio node 242 hardware is illustrated in FIGS. 2B and 2C. As shown in FIG. 2B, radio node 242 includes microprocessor 242a coupled to Class 2 hardware interface circuitry 242c, CAN hardware interface circuitry 242d and MOST hardware interface circuitry 242e, each of which enables microprocessor 242a to separately communicate with Class 2 bus 110, CAN bus 120 and MOST bus 140, respectively. Radio node 242 also may include other hardware 242f coupled to microprocessor 242a.

An alternative form of radio node 243 hardware is shown in FIG. 2C. As shown, radio node 243 may include two microprocessors 243a, 243b connected by serial bus 243g. In this radio node 243, microprocessor 243a is in communication with Class 2 bus 110 and CAN bus 120 via Class 2 interface 242c and CAN interface 242d. Microprocessor 243b communicates with MOST bus 140 through MOST interface 242e. Radio node 243 also may include other hardware 243f.

Figure 3:
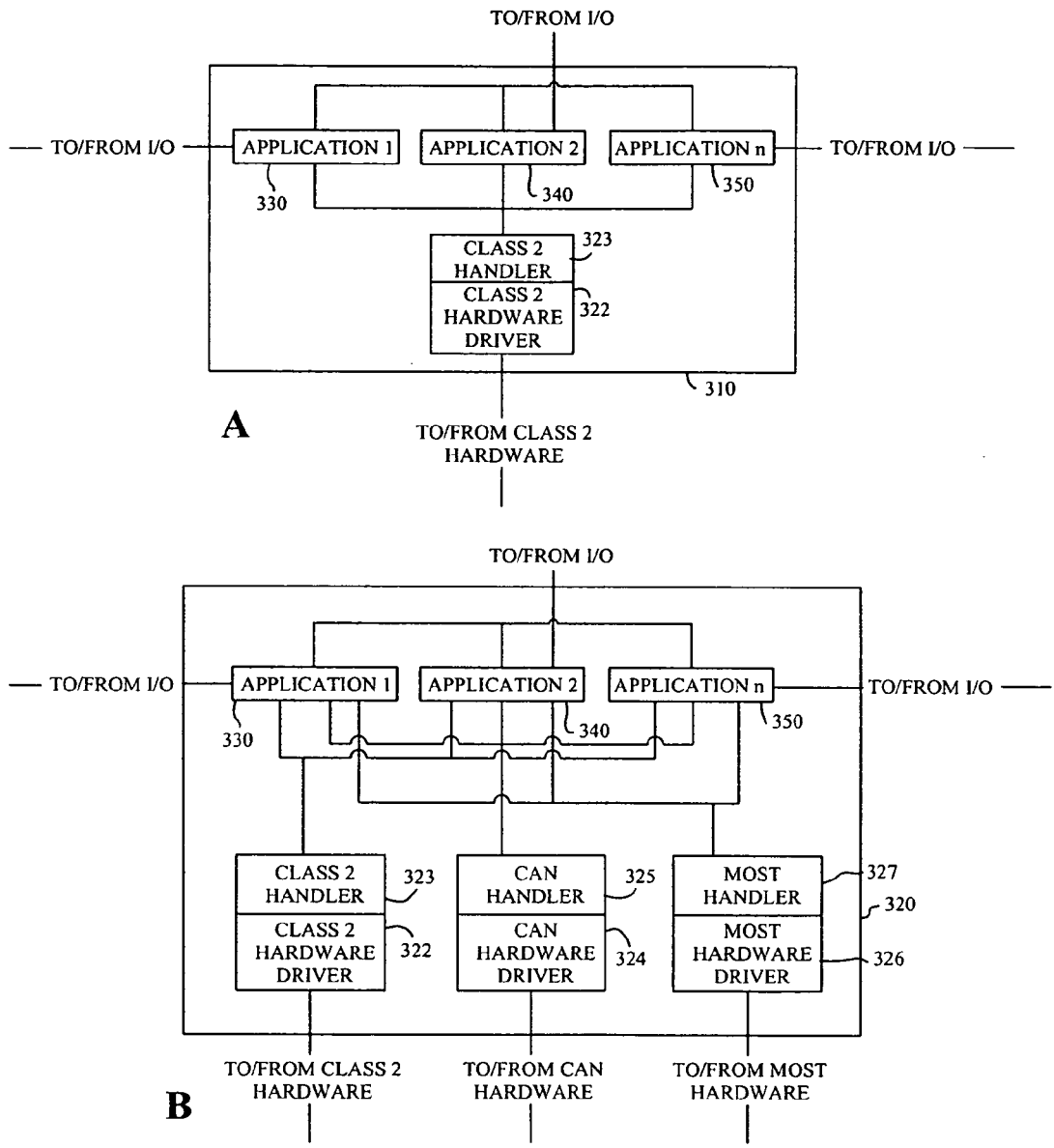
FIG. 3A is a perspective view of a prior art software architecture for use in the processor of FIG. 2A.
FIG. 3B is a perspective view of a prior art software architecture for use in the processor of FIG. 2B when gateway modules are not present.

Each of the microprocessors described above use software to carry out various tasks. FIG. 3A depicts software architecture 310 for microprocessor 212a of lock node 212. Software architecture 310 includes Class 2 hardware driver 322, which controls Class 2 interface circuitry 212c, and Class 2 handler 323, which is specific to Class 2 and communicates with applications 330, 340, 350. The programming of software architecture 310 enable applications 330, 340, 350 to communicate over Class 2 bus 110.

Shown in FIG. 3B is software architecture 320 used by microprocessor 242a of radio node 242. Software architecture 320 includes three drivers—Class 2 driver 322, CAN driver 324 and MOST driver 326. Class 2 driver 322 controls Class 2 hardware interface circuitry 242c and is in communication with Class 2 handler 323. CAN driver 324 controls CAN hardware interface circuitry 242d and communicates with CAN handler 325, and MOST driver 326 controls MOST hardware interface circuitry 242e and communicates with MOST handler 327. Each of handlers 323, 325 and 327 route messages to one or more of respective applications 330, 340 and 350. Software architecture 320 may be more complex than that of software architecture 310 because radio node 242 is coupled to multiple busses and software architecture 320 may enable each of applications 330, 340, 350 to send and receive messages over each of Class 2 bus 110, CAN bus 120 and MOST bus 140. Thus, each of handlers 323, 325 and 327 may communicate with each of applications 330, 340 and 350. An increase in complexity of software architecture 320 adds cost and expense to its development.

When multiple communication buses are present in a network, the buses are typically connected by gateway devices. Gateway devices allow communications originating on one communication bus to proceed on another communication bus. Gateways are generally implemented in software, and depending on the number of communication buses utilizing different communication protocols in a vehicle communication network, gateway devices can become very expensive to develop for in-vehicle networking.

Referring back to FIG. 1, radio node 142 and telematics unit 148 act as gateway devices between nodes on network 100. Radio node 142 provides access between the nodes on Class 2 bus 110, CAN bus 120 and MOST bus 140. Telematics node 148 provides access between nodes on MOST bus 140, 802.11 bus 160 and GSM bus 170. J1962 connector 130 is not a gateway device, but it is a physical and direct connection to vehicle network 100 by way of CAN bus 120. The only way to access nodes not on CAN bus 120 via J1962 connector 130 is to use radio node 142 as a gateway between CAN bus 120 and either of Class 2 and MOST buses, 110, 140, respectively. Similarly, to access all nodes in vehicle communication network 100 from entities outside of network 100, radio node 142 and telematics node 148 must be used as gateways as well.

The depth of vehicle network 100 provides problems for remote diagnostics because the utilization of one or more gateway devices may be necessary to enable communications between a diagnosing entity and a node to be diagnosed. For example, if it becomes necessary for gas pump 152 and ECM node 121 to communicate for diagnostics purposes, two gateways must be used. Any message transmitted between ECM node 121 and gas pump 152 must be transmitted on CAN bus 120, through radio node 142, on MOST bus 140, through telematics node 148 and on 802.11 bus 160. Similarly, if ECM node 121 needs to communicate with telematics service center 150, any transmitted message must travel on buses 120, 140, 170 and hop gateways 142, 148.

Figure 4:
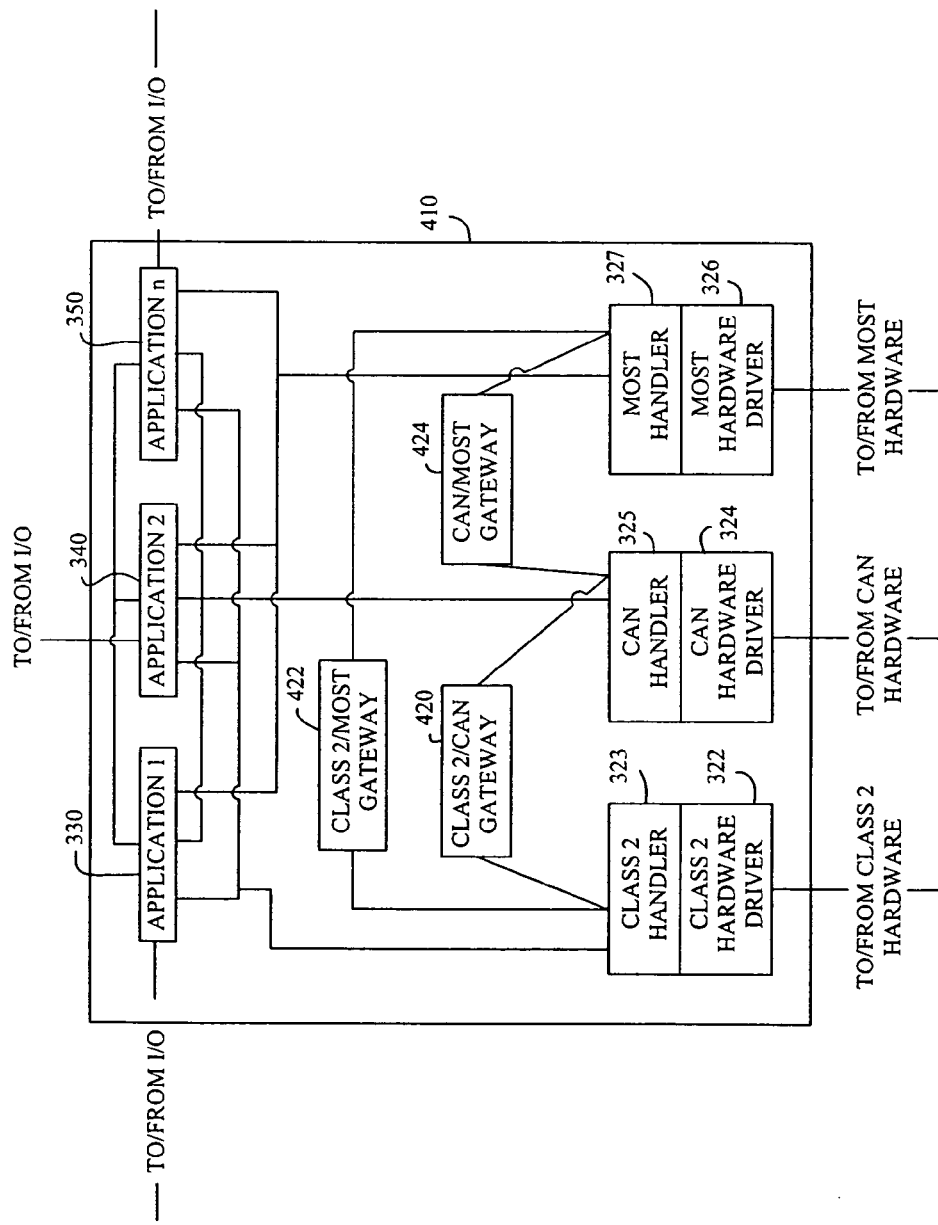
FIG. 4 is a perspective view of a prior art software architecture for use in the processor of FIG. 2B when gateway modules are present.

FIG. 4 depicts a prior art software architecture for use in microprocessor 242a of radio node 242 in FIG. 2B. The architecture remains the same for both a solution that defines new messages for travel on different communication buses and a solution that uses tunneling with or without filtering. Software architecture 410 includes Class 2 hardware driver 412, CAN hardware driver 414 and MOST hardware driver 416. Class 2 hardware driver 322 communicates with Class 2 bus 110 through Class 2 interface 242c, CAN hardware driver 324 communicates with CAN bus 120 through CAN interface 242d, and MOST hardware driver 326 communicates with MOST bus 140 through MOST interface 242e. Class 2 handler 323 is in communication with Class 2 driver 322, CAN handler 325 communicates with CAN driver 324, and MOST handler 327 communicates with MOST driver 326. Each of handlers 323, 325, 327 may route messages to applications 330, 340, 350.

Gateway architectures 420, 422, 424 enable messages to be passed between nodes on Class 2 bus 110 and nodes on CAN bus 120, between nodes on Class 2 bus 110 and nodes on MOST bus 140, and between nodes on CAN bus 120 and nodes on MOST bus 140, respectively. Accordingly, an unfiltered message communicated between nodes on Class 2 bus 110 and nodes on CAN bus 120 passes between handlers 323 and 325. An unfiltered message communicated between nodes on Class 2 bus 110 and nodes on MOST bus 140 passes between handlers 323 and 327, and an unfiltered message communicated between nodes on CAN bus 120 and nodes on MOST bus 140 passes between CAN handler 325 and MOST handler 327. Gateway architectures 420, 422, 424 may pass some or all messages between buses 110, 120, 140 using the tunneling with/without filtering solutions described above.

Nodes such as radio node 142 of FIG. 1 that provide full gateway functionality between multiple communication buses must have Choose (n,2) gateway modules to gateway between the multiple buses where n is the number of communication buses in the network. As n grows, the number of gateway modules necessary to provide the gateway functionality grows as well. For this reason, vehicle networks containing many communication buses often require many gateway modules, which add to the filtering problems described above. The present invention enables the use of a number of gateway software modules equal to the number of gateway devices providing gateway functionality in the network. For example, in software architecture 410, three gateway modules 420, 422, 424 are necessary. The present invention, however, would enable the use of one gateway module in software architecture 410. The present invention also allows identical gateway modules to be used in different nodes, which enables cost savings because less programming is necessary to develop the gateway modules.

Figure 5:
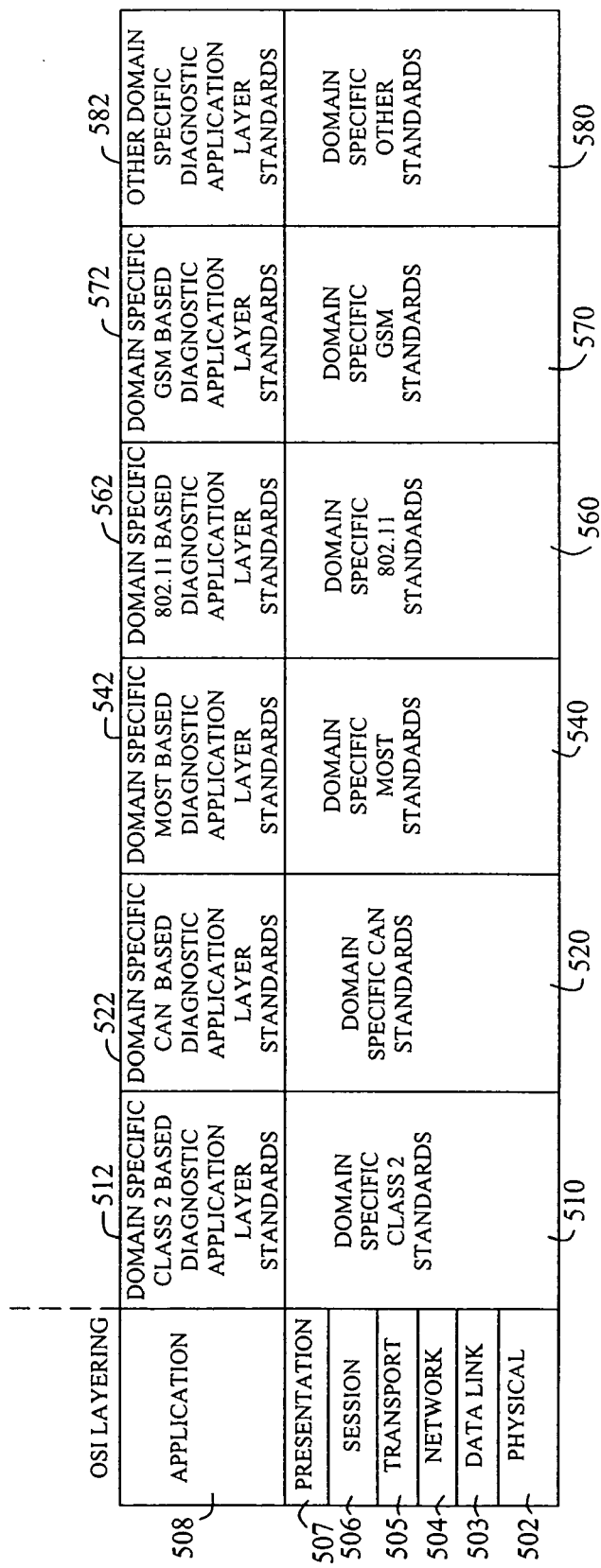
FIG. 5 is a diagram illustrating sets of requirements documentation that have been used in diagnostics to implement the prior art vehicle communication network of FIG. 1 in accordance with data communication protocols adhering to the OSI model.

FIG. 5 illustrates the scopes of traditional sets of requirements documentation that have been used to implement the vehicle communication network of FIG. 1. The communication protocols that enable communication between the devices of vehicle communication network 100 are often conceptualized as the OSI model. The oft-tightly coupled communication definitions of physical layer 502, data link layer 503, network layer 504, transport layer 505, session layer 506, presentation layer 507 and application layer 508 differ according to the communication bus in which the layers' functionalities are implemented and the specific domain for which the buses are designed (e.g., a bus for use in automotive company X's vehicle necessarily has different design standards than a bus for use in automotive company Y's vehicle). Accordingly, traditional sets of requirements documentation have provided that domain specific Class 2 standards 510 are used to implement the functionalities of physical layer 502 through presentation layer 507 of Class 2 bus 110 (FIG. 1), domain specific CAN standards 520 are used to implement the functionalities of layers 502-507 of CAN bus 120, domain specific MOST standards 540 are used to implement the functionalities of layers 502-507 of MOST bus 140, domain specific 802.11 standards 260 are used to implement the functionalities of layers 502-507 of 802.11 bus 160, domain specific GSM standards 570 are used to implement the functionalities of layers 502-507 of GSM bus 170 and other domain specific standards 580 are used to implement the functionalities of layers 502-507 of any other bus that may be present in vehicle communication network 100.

The use of domain specific standards 510, 520, 540, 560, 570, 580, respectively, to implement the functionalities of physical layer 502 through presentation layer 507 typically has prevented applications designed for use with one standard from being used with another standard. For this reason, requirements documentation have also normally identified domain specific diagnostic applications to implement the functions of application layer 508 when domain specific standards are used to implement the functions of layers 502-507. For example, Class 2 based diagnostic application layer standards 512 are used to implement application layer 508 functionality when domain specific Class 2 standards 510 are used to implement the functions of layers 502-507. Similarly, domain specific CAN based diagnostic application layer standards 522 are traditionally used in conjunction with domain specific CAN standards 520, domain specific MOST based diagnostic application layer standards 542 are used with domain specific MOST standards 540, domain specific 802.11 based diagnostic application layer standards 562 are used with domain specific 802.11 standards 560, domain specific GSM based diagnostic application layer standards 572 are used with domain specific GSM standards 570, and other domain specific diagnostic application layer standards 582 are used with other corresponding domain specific standards 580.

Figure 6:
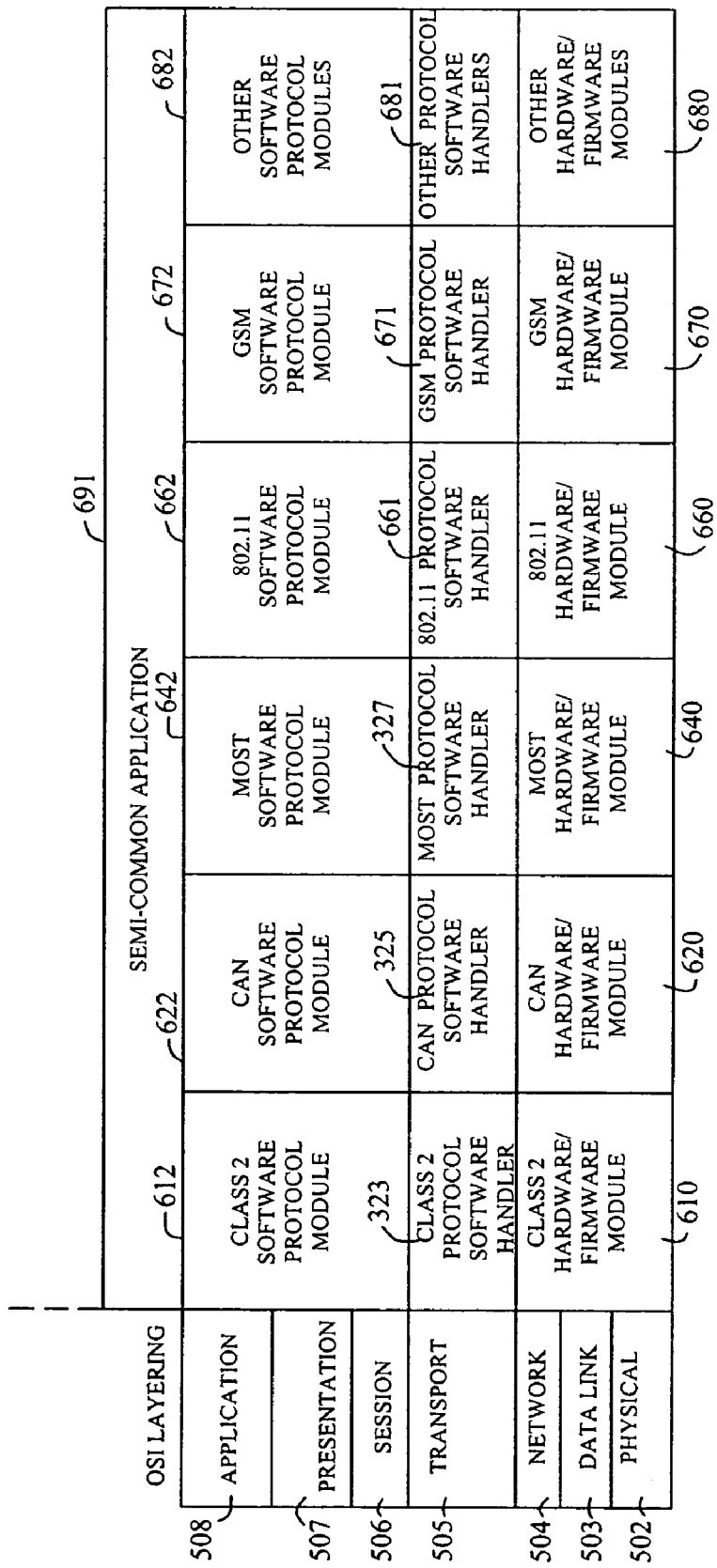
FIG. 6 is a diagram illustrating prior art engineering design elements that have been used in diagnostics to implement the vehicle communication network of FIG. 1 in accordance with data communication protocols adhering to the OSI model and the requirements of the documentation of FIG. 5.

Depicted in FIG. 6 is a diagram illustrating specific engineering design elements that traditionally have been used in diagnostics to implement the vehicle communication network of FIG. 1 based on the requirements documentation described with regard to FIG. 5. In the OSI model, lower layers 502, 503, 504, 505 handle data transport issues and are typically implemented in hardware and software. Thus, traditional engineering design elements include the implementation of the lower layer functionalities of the Class 2 protocol with hardware/firmware module 610 and Class 2 protocol software handler 323, the implementation of the lower layer functionalities of the CAN protocol with hardware/firmware module 620 and CAN protocol software handler 325, the implementation of the lower layer functionalities of the MOST protocol with hardware/firmware module 640 and MOST protocol software handler 327, the implementation of the lower layer functionalities of the 802.11 protocol with hardware/firmware module 660 and 802.11 protocol software handler 661, the implementation of the lower layer functionalities of the GSM protocol with hardware/firmware module 670 and GSM protocol software handler 671, and the implementation of the lower layer functionalities of any other adequate protocols with other hardware/firmware modules 680 and other protocol software handlers 681. Each of hardware/firmware modules 610, 620, 640, 660, 670, 380 and protocol software handlers 323, 325, 327, 661, 671, 681 couple the functions of OSI model layers 502-505 together in a way specific to the communication bus on which the respective modules and handlers are used. Consequently, each of Class 2, CAN, MOST, 802.11, GSM and protocol software handlers 323, 325, 327, 661, 671, 681 contain separate and distinct transport layer functionality.

The implementation of OSI model layers 502-505 with a particular communication protocol limits the communication protocols that can be used to implement the functions of session layer 506 through application layer 508. If Class 2 hardware/firmware module 610 is chosen in implementing physical layer 502 functions, then Class 2 software protocol module 612 is typically used to implement layer 506-508 functions. Likewise, the implementation of the functions of layers 502-505 with any of CAN hardware/firmware module 620, MOST hardware/firmware module 640, 802.11 hardware/firmware module 660, GSM hardware/firmware module 670, other hardware/firmware modules 680 and any of corresponding protocol software handlers 323, 325, 327, 661, 671, 681 typically limits the implementation of the functions of layers 506-508 to the corresponding CAN software protocol module 622, MOST software protocol module 642, 802.11 software protocol module 662, GSM software protocol module 672 and other software protocol module 682, respectively.

While it is possible that upper layer protocol modules different from those identified in FIG. 6 may be run on top of any of hardware/firmware modules 610, 620, 640, 660, 670, 680 and protocol software handlers 323, 325, 327, 661, 671, 681, the restrictions of hardware/firmware modules 610, 620, 640, 660, 670, 680 and protocol software handlers 323, 325, 327, 661, 671, 681 tend to preclude the use of other communication buses' upper layer protocols. For example, choosing to implement the functions of physical layer 502 through network layer 504 with Class 2 hardware/firmware module 610 and transport layer 505 with Class 2 protocol software handler 611 generally precludes the use of CAN software protocol module 622 because CAN messages may be too long to fit in Class 2 messages, and the details of low-level coding on Class 2 hardware/firmware module 610 and CAN hardware/firmware module 620 which impact upper layer message design may be incompatible.

A semi-common application 691 may be defined to allow an end user to interface with a device coupled to any of Class 2, CAN, MOST, 802.11 and GSM communication buses 110, 120, 140, 160, 170 for diagnostics purposes. For example, an end user may need to read the software ID of a node, obtain a list of Diagnostic Trouble Codes, or scroll through a display of current memory contents. If a user interface is utilized, generally only semi-common application 691 is used with prior art applications because each of Class 2, CAN, MOST, 802.11 and GSM communication buses 110, 120, 140, 160, 170 has particular restrictions that must be taken into account in order to get diagnostics functionality to work. For example, the format and meaning of node addresses typically differ greatly across buses 110, 120, 140, 160, 170. Therefore, while each bus 110, 120, 140, 160, 170 is associated with a semi-common application 691 having a display/control for node IDs, the design details of the semi-common application 691 for each bus 110, 120, 140, 160, 170 differs according to the specifications of that bus 110, 120, 140, 160, 170.

Figure 7:
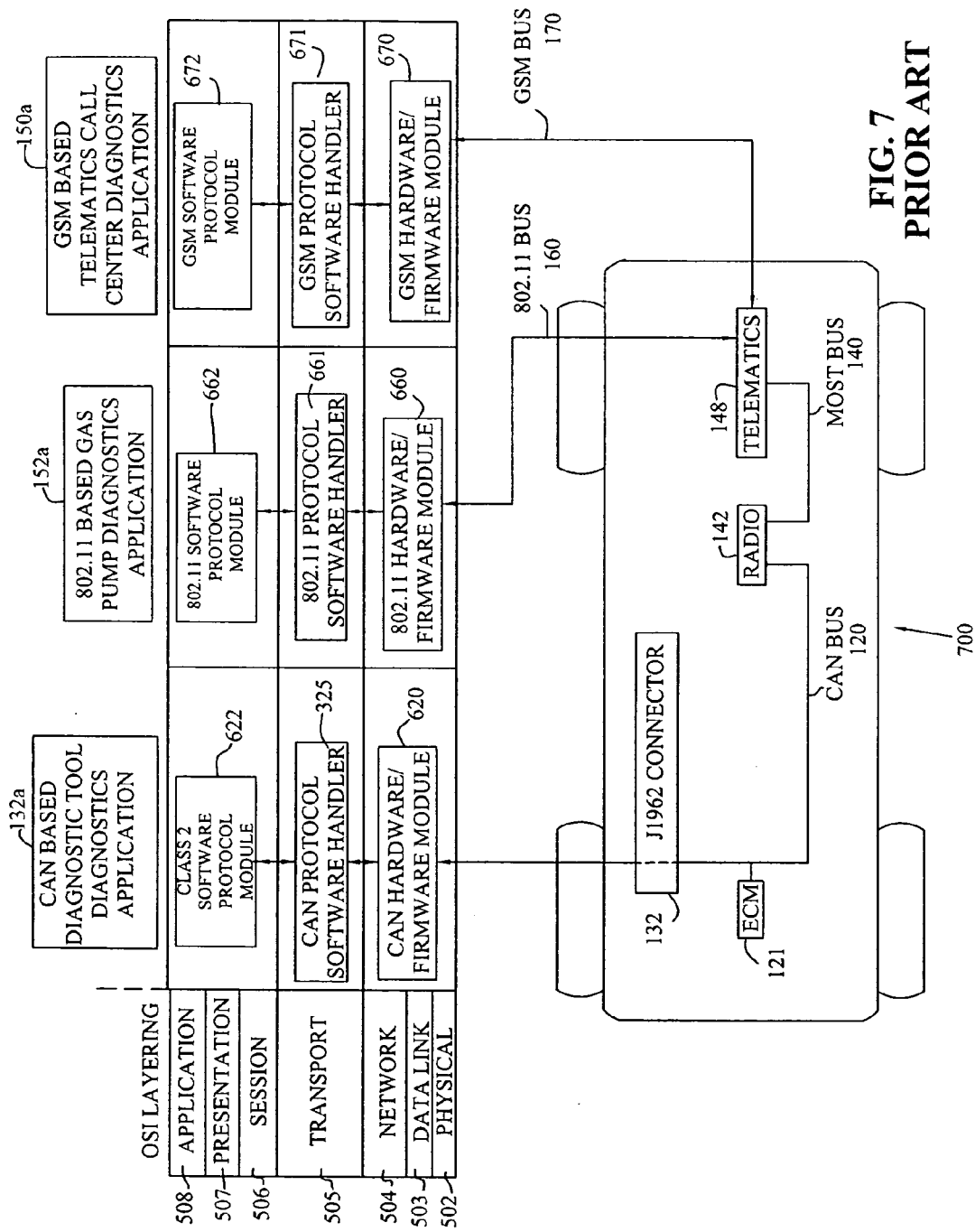
FIG. 7 is a diagram illustrating the prior art engineering design elements of FIG. 6 applied to the prior art vehicle communication network of FIG. 1, the vehicle communication network utilizing data communication protocols adhering to the OSI model in the context of remote diagnostics.

The engineering design elements depicted in FIG. 6 are shown in FIG. 7 applied to vehicle communication network 700. Nodes on network 700 must be diagnosed according to the protocol supported by the communication bus to which the node is coupled. If 802.11 based gas pump diagnostics application 152a diagnoses ECM 121, 802.11 software protocol module 662 encapsulates a CAN message in a MOST message, and then encapsulates those messages in a message formatted for the protocol being used over 801.11 bus 160. That message is then passed over 802.11 bus 160 to telematics node 148, which de-capsulates the message to reveal the MOST formatted message, and the MOST message is then passed over MOST bus 140 to radio node 142. Radio node 142 de-capsulates the MOST formatted message to reveal the CAN formatted message, and radio node's 142 CAN driver forwards this message to ECM node 121 over CAN bus 120. The reverse takes place when ECM node 121 returns a message to 802.11 based gas pump diagnostics application 152a. This tunneling solution requires 802.11 based gas pump diagnostics application 152a to know in advance the protocols used by the buses over which its messages are to be sent so that it can properly prepare the message for travel over the different communication buses.

Figure 8:
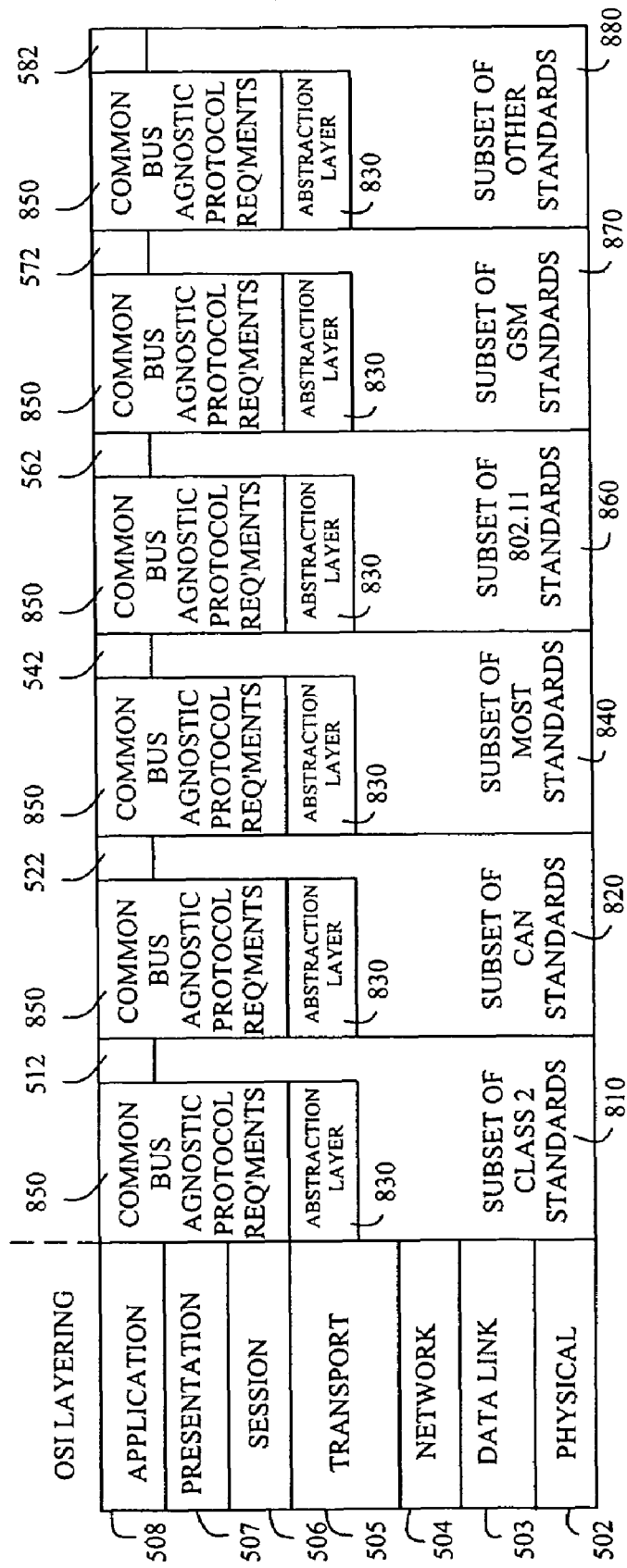
FIG. 8 is a diagram illustrating sets of requirements documentation that may be used in diagnostics to implement the vehicle communication network of FIG. 1, the network's data communication protocols including the abstraction layer of the present invention.

The addition of the abstraction layer of the present invention to any data communication protocol overcomes the problems encountered when performing diagnostics on nodes within a vehicle communication network consisting of multiple, interconnecting, non-homogenous communication buses that are of arbitrary depth. FIG. 8 illustrates the requirements documentation that may be used to implement vehicle communication network 100 of FIG. 1 when network 100 utilizes a data communication protocol having the abstraction layer of the present invention. The requirements documentation may provide that subset of Class 2 standards 810, subset of CAN standards 820, subset of MOST standards 840, subset of 802.11 standards 860, subset of GSM standards 870, and a subset of other standards 880 are used to implement functionalities of physical layer 502, data link layer 503, network layer 504, transport layer 505, session layer 506 and presentation layer 507. The requirements documentation may also include documentation 830 for the abstraction layer of the present invention. Documentation 830 may provide that the abstraction layer is used to implement transport layer 505 functionality in addition to the transport layer 505 functionality respectively implemented by subsets of standards 810, 820, 840, 860, 870, 880. Communication bus-agnostic protocol requirements 850 are used to facilitate the implementation of functionalities of session layer 506, presentation layer 507 and application layer 508 in parallel with the diagnostic application layer standards already used—domain specific Class 2 based diagnostic application layer standards 512, domain specific CAN based diagnostic application layer standards 522, domain specific MOST based diagnostic application layer standards 542, domain specific 802.11 based diagnostic application layer standards 562, domain specific GSM based diagnostic application layer standards 572 and any other domain specific diagnostic application layer standards 582.

Figure 9:
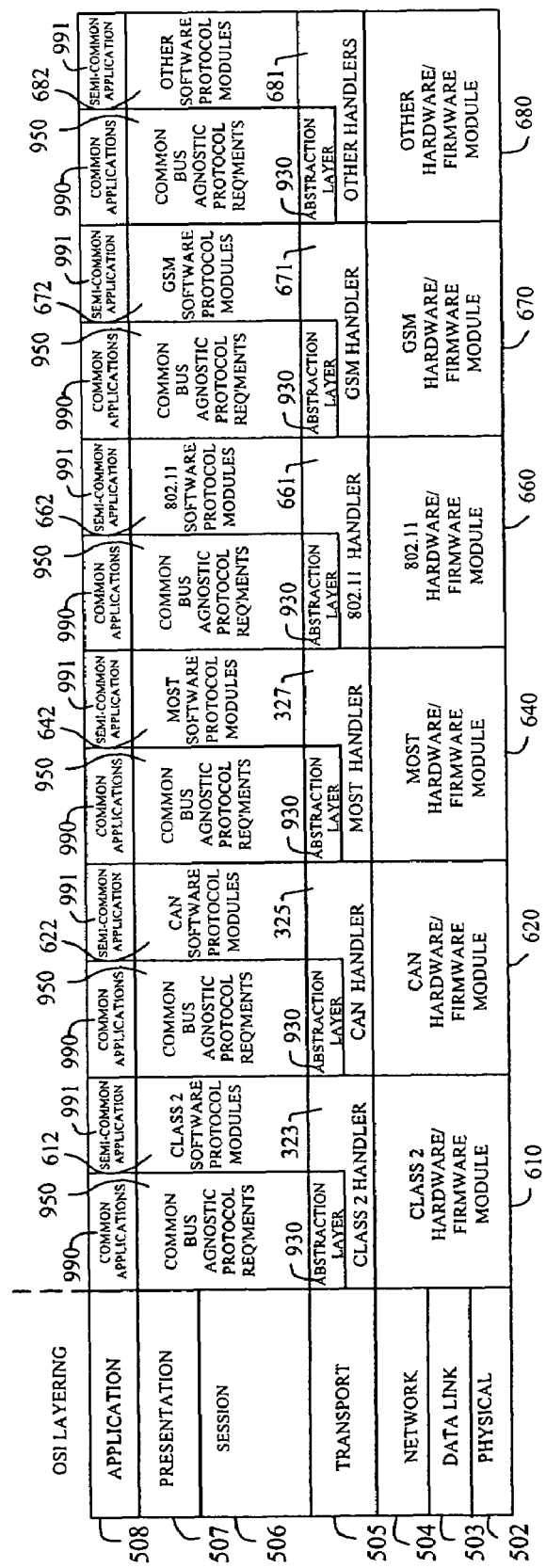
FIG. 9 is a diagram illustrating engineering design elements that may be used in diagnostics to implement the vehicle communication network of FIG. 1, the network's data communication protocols including the abstraction layer of the present invention.

An exemplary embodiment of a protocol having the abstraction layer of the present invention is captured by the engineer design elements shown in FIG. 9. The functionalities of physical layer 502, datalink layer 503 and network layer 504 are implemented with one of Class 2 hardware/firmware module 610, CAN hardware/firmware module 620, MOST hardware/firmware module 640, 802.11 hardware/firmware module 660, GSM hardware/firmware module 670 and other hardware/firmware module 680. The functionalities of transport layer 505 are implemented with one of Class 2 protocol software handler 323, CAN protocol software handler 325, MOST protocol software handler 327, 802.11 handler 661, GSM protocol software handler 671, other protocol software handlers 681 and abstraction layer 930.

Abstraction layer 930 runs on top of transport layer 505 of each of Class 2 protocol software handler 323, CAN protocol software handler 325, MOST protocol software handler 327, 802.11 protocol software handler 661, GSM protocol software handler 671 and other protocol software handlers 681. In doing so, abstraction layer 930 provides a common transport service to common bus-agnostic protocol modules 950. The utility of abstraction layer 930 is most evident when comparing FIGS. 6 and 9. In FIG. 6, the use of any of Class 2, CAN, MOST, 802.11, GSM or other hardware/firmware modules 610, 620, 640, 660, 670, 680 and corresponding protocol software handlers 323, 325, 327, 661, 671, 681 to implement the functions of physical layer 502 through transport layer 505 limits the protocols that may be used to implement session layer 506, presentation layer 507 and application layer 508 functions because the protocols must meet certain requirements specific to each of hardware/firmware modules 610, 620, 640, 660, 670, 680 and protocol software handlers 323, 325, 327, 661, 671, 681. On the contrary, abstraction layer 930 enables common bus-agnostics protocol modules 950 to implement session layer 506, presentation layer 507 and application layer 508 functions.

Because abstraction layer 930 provides transport layer 505 functionality in addition to the transport layer 505 functionality implemented by each of Class 2, CAN, MOST, 802.11, GSM and other protocol software handlers 323, 325, 327, 661, 671, 681, common communications provided by common bus-agnostic protocol modules 950 on top of abstraction layer 930 use the transport layer 505 functionalities of both the relevant Class 2, CAN, MOST, 802.11, GSM and other protocol software handlers 323, 325, 327, 661, 671, 681 and abstraction layer 930. Additionally, any of respective Class 2, CAN, MOST, 802.11, GSM and other software protocol modules 612, 622, 642, 662, 672, 682 may provide traditional communications in parallel with the common communications by using the transport layer 505 functionality of any of the corresponding Class 2, CAN, MOST, 802.11, GSM and other protocol software handlers 323, 325, 327, 661, 671, 681 without using abstraction layer 930. Semi-common applications 691 are used to interface with traditional communications between nodes on different communication buses because each of software protocol modules 612, 622, 642, 662, 672, 682 is specific to the communication bus on which it is used. However, because abstraction layer 930 and common bus-agnostic protocol modules 950 enable common communications between nodes on different communication buses, common applications 990 may be reused across products regardless of differences in the underlying communications busses 610, 620, 640, 660, 670, 680. In this way, the invention achieves the theoretical reuse intent of the OSI 7-layer model even in situations where a diversity of highly-optimized busses with poor layering would otherwise prevent efficient reuse at the higher protocol layers 506, 507, 508.

Figure 2:
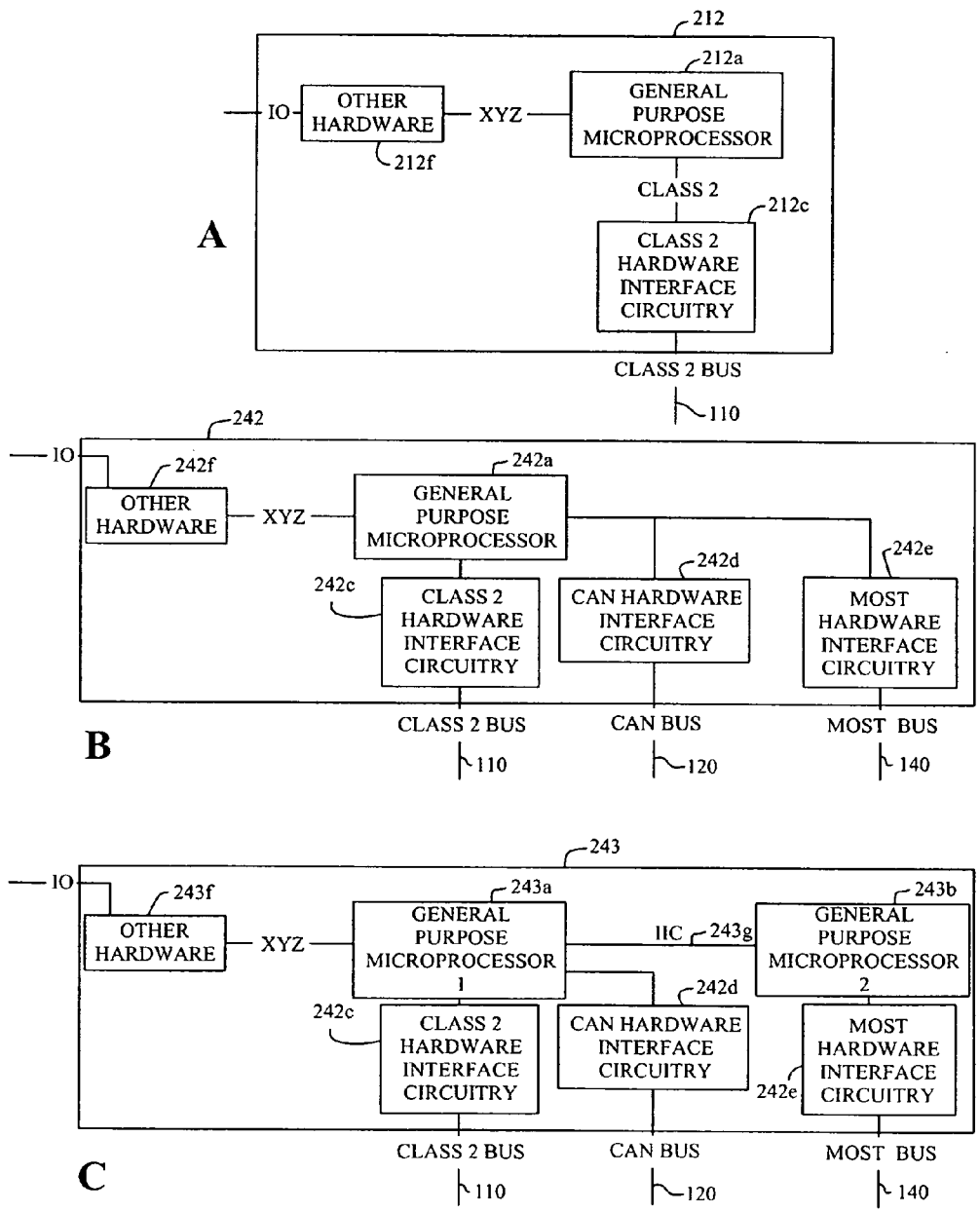
FIG. 2A is a perspective view of the prior art hardware of a node coupled to a single communication bus of the vehicle communication network of FIG. 1.
FIG. 2B is a perspective view of the prior art hardware of a single microprocessor node coupled to multiple communication buses of the vehicle communication network of FIG. 1.
FIG. 2C is a perspective view of the prior art hardware of another form of the FIG. 2B node having multiple processors.
Figure 10:
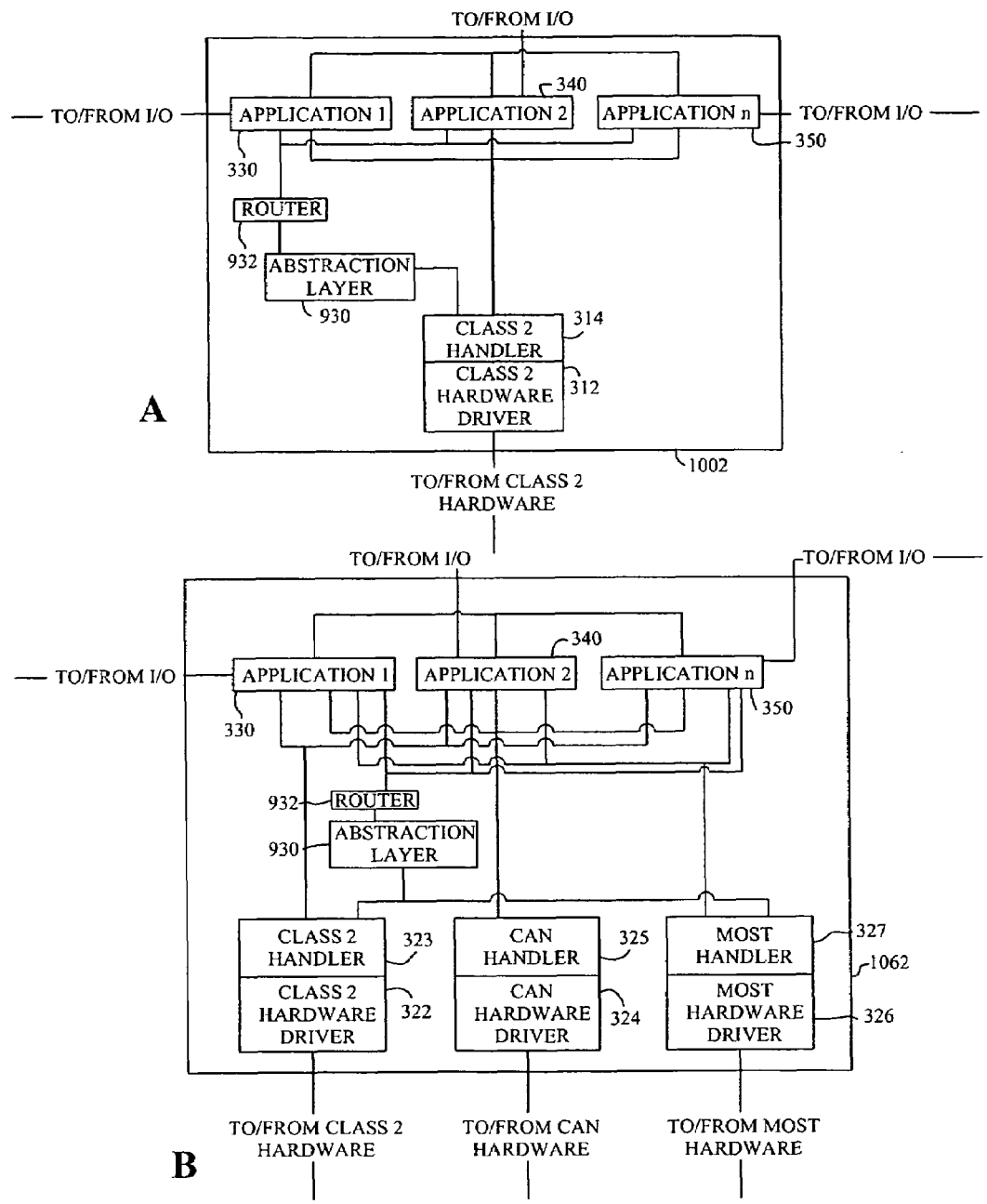
FIG. 10A is a perspective view of a software architecture for use in the processor of FIG. 2A, the software architecture implementing the abstraction layer of the present invention.
FIG. 10B is a perspective view of a software architecture for use in the processor of FIG. 2B, the software architecture implementing the abstraction layer of the present invention.

The software architecture of a node implementing abstraction layer 930 of the present invention is shown in FIGS. 10A and 10B. Software architecture 1002 of FIG. 10A may be used in processor 212a of lock node 212 (FIG. 2). Because lock node 212 is coupled to Class 2 bus 110, software architecture 1002 includes Class 2 hardware driver 312 that controls Class 2 interface circuitry 212c and is in communication with Class 2 handler 314. Class 2 handler 314 is connected to abstraction layer module 930, and abstraction layer module 930 communicates with router 932. Router 932 is known in the art and may route messages between abstraction layer 930 and applications 330, 340, 350. Abstraction layer module 930 may be implemented in identical fashion in any of the nodes in vehicle communication network 100 of FIG. 1.

In an exemplary embodiment of the present invention, abstraction layer 930 is implemented on top of a hardware and/or software platform that may be used in every node of network 100 and provides a common application program interface between abstraction layer 930 and Class 2, CAN and MOST handlers 323, 325, 327. For example, a proprietary hardware/software architecture may be used that contains each of Class 2, CAN and MOST hardware interface circuitries 242c, 242d, 242e as well as Class 2, CAN and MOST drivers 322, 324, 326 and handlers 323, 325, 327.

FIG. 10B shows the software architecture of a node connected to multiple communication buses and implementing abstraction layer 930 of the present invention. Software architecture 1062 may be used in processor 242a of radio node 142 of vehicle network 100 (FIG. 1). Since radio node 142 is coupled to Class 2 bus 110, CAN bus 120 and MOST bus 140, software architecture 1062 includes Class 2 hardware driver 322, CAN hardware driver 324 and MOST hardware driver 326, each of which controls one of Class 2 hardware interface circuitry 242c, CAN hardware interface circuitry 242d and MOST hardware interface circuitry 242e. Class 2 driver 322 communicates with Class 2 handler 323, CAN hardware driver 324 communicates with CAN handler 325 and MOST hardware driver 326 communicates with MOST handler 327. Each of handlers 323, 325, 327 connect to abstraction layer 930, and abstraction layer module 930 connects to router 932. Router 932 is connected to and may route messages to applications 330, 340, 350. Class 2 handler 323, CAN handler 325 and MOST handler 327 may connect to one or more applications 330, 340, 350 as well. Abstraction layer 930 may be implemented the same way in radio node 142 as it is implemented in lock node 112.

Figure 11:
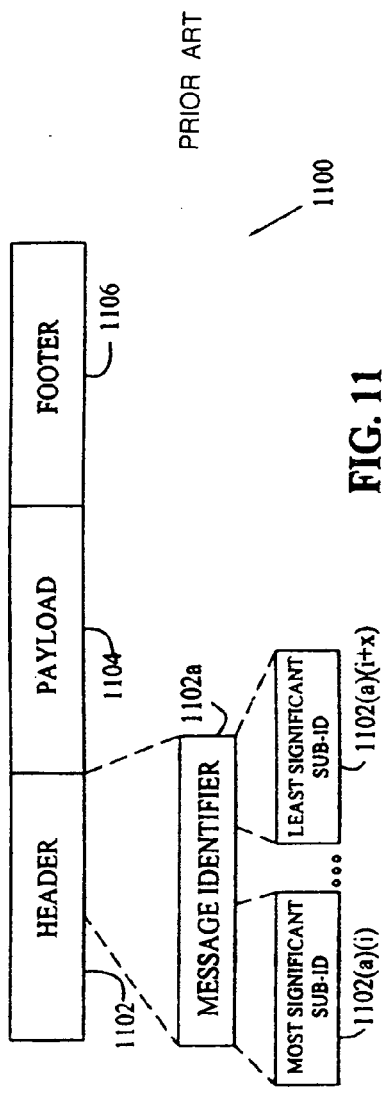
FIG. 11 is a diagram illustrating the message structure of a message defined by a prior art data communication protocol.

The structure of a message defined by prior art data communication protocols is shown in FIG. 11. Message 1100 includes communication bus header 1102, payload 1104 and communication bus footer 1106. Header 1102 includes fixed-format message identifier 1102a. Message identifier 1102a identifies the message. Message identifier 1102a may include multiple sub-identifiers 1102(a)(1) ... 1102(a)(1+x) to establish a hierarchy of identifiers. The identification of message 1100 is normally made based on the order of most significant sub-identifier 1102(a)(1) to the next most significant sub-identifier, ..., to the next to least significant sub-identifier, to least significant sub-identifier 1102(a)(1+x). Interpreted in order of succession, each sub-identifier is interpreted in the context of the next most significant sub-identifier.

Figure 12:
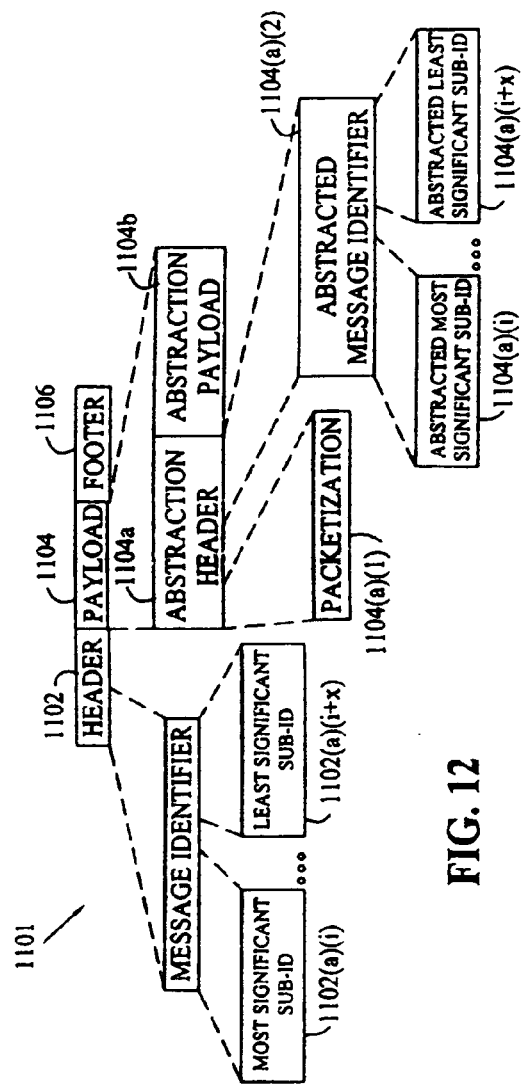
FIG. 12 is a diagram illustrating the general message structure of a message defined by a data communication protocol including the abstraction layer of the present invention.

The message structure of a message defined by a data communication protocol including abstraction layer 930 of the present invention is shown in FIG. 12. Message 1101 is an adaptation of message 1100 that enables abstracted diagnostics at the application layer. For this reason, like message 1100, message 1101 includes the same structure as message 1100-communication bus header 1102, payload field 1104 and communication bus footer 1106. Unlike message 1100, however, payload field 1104 comprises abstraction header 1104a and abstracted payload 1104b. Abstraction header 1104a includes packetization bits 1104(a)(1) and abstracted message identifier 1104(a)(2). Abstracted message identifier 1104(a)(2) may include multiple abstracted sub-identifiers 1104(a)(2)(i) ... 1104(a)(2)(i+y).

Figure 13:
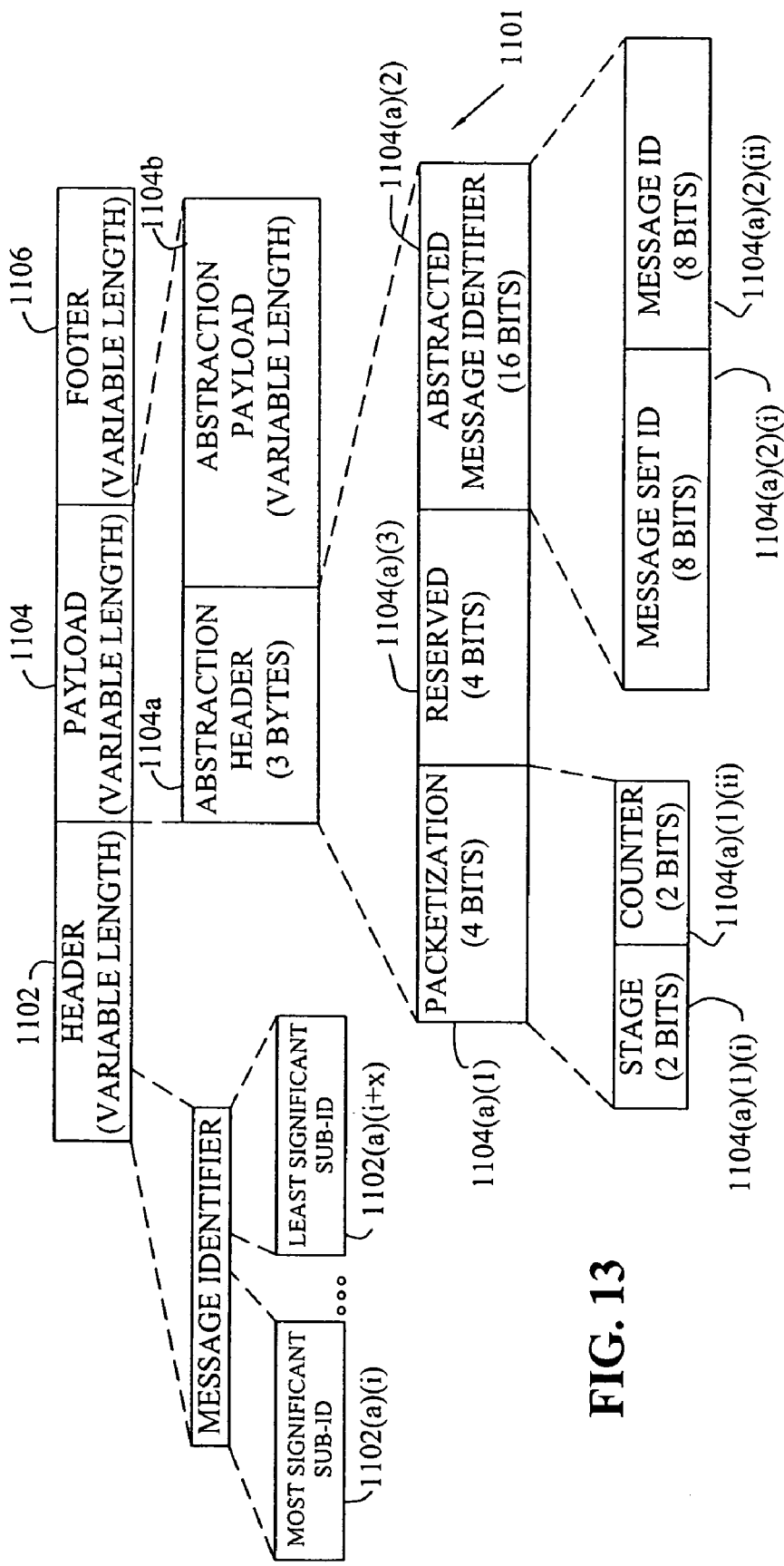
FIG. 13 is an diagram illustrating an exemplary embodiment of the message structure illustrated in FIG. 12.

An exemplary embodiment of message 1101 is shown in FIG. 13. Again, message 1101 includes communication bus header 1102, payload field 1104 and communication bus footer 1106. Payload field 1104 comprises abstraction header 1104a and abstracted payload 1104b. Abstraction header 1104a includes packetization bits 1104(a)(1) as well as reserved bits 1104(a)(3) and abstracted message identifier field 1104(a)(2). Reserved bits 1104(a)(3) are padding to separate packetization functionality from message identification functionality at a byte boundary and also to provide future protocol enhancements. Packetization bits 1104(a)(1) include stage bits 1104(a)(1)(i) and counter bits 1104(a)(1)(ii). Stage bits 1104(a)(1)(i) identify the current stage of a message transmission.

For purposes of the present invention, the transmission of a message has four stages: 1) the first packet of a one-packet message (0b00); 2) the first packet of a multi-packet message (0b01); 3) the middle packet of a multi-packet-message (0b10); and 4) the last packet of a multi-packet message (0b11). Counter bits 1104(a)(1)(ii) are a rolling 2-bit integer value that reset to zero for the first packet of any new message and increments by one for each subsequent packet in any multi-packet message. What identifies message 1101 as being the abstracted case resides outside of the abstraction header 1104a, and may reside within communication bus header 1102 or communication bus footer 1106. Identifying message 1101 as being abstracted may be done by assigning one message identifier 1102(a)(i) ... 1102(a)(i+x) on the underlying communication bus to identifying the abstracted case of 1104, while leaving all other message identifiers 1102(a)(i) ... 1102(a)(i+x) on the underlying communication bus available for traditional cases. This, in concert with 1104(a)(1) and 1104(a)(2) allows abstracted content to flow across the existing underlying communication bus in parallel with traditional content.

The above exemplary embodiment provides several important features. First, the packetization scheme is efficient, using only four bits. This is critical for operation on automotive buses with very low payload sizes such as Class 2. Second, the stage and counter values are purposely chosen so that all bits are zero when packetization is not triggered (i.e. the entire message above layer 930 fits into a single underlying bus message below 930). This allows implementation of packetization algorithms to be optional in cases where packetization is known in advance never to be required. In other words, if one knows all messages will always fit on the underlying bus without breaking it apart in pieces, then the 903 algorithm only need add/remove the abstraction header 1104a and send/expect 0000 in all cases as the packetization bits. Third, with 0000 as the default for the reserved bits until their later definition, the entire byte for packetization and reserved bits 1104(a)(1) and 1104(a)(3) is 00000000 in all cases where packetization is not triggered. Fourth, because 930 is a secondary transport layer running on top of an underlying transport layer, it can be assumed that adequate mechanisms for transport layer reliability such as retries and checksums have already been provided for in the underlying transport layer in support of the traditional upper layer communications. Bit error detection/correction is fully addressed in the underlying layer, and dropped messages are handled in the underlying layer for all cases except when packetization is triggered. The two-bit counter and two-bit stage therefore efficiently avoid the overhead of bit error detection/correction issue altogether and provide a reasonable means for detecting most cases of dropped messages on the underlying protocol when packetization is triggered.

Packetization bits 1104(a)(1) allow arbitrary message identifier 1104(a)(2) to be transmitted over arbitrary communication buses of vehicle network 100 and abstracts payload 1104b from the specifics of header 1102 and foot 1106. Packetization bits 1104(a)(1) also breaks up abstracted payload 1104b and enable it to be sent in multiple messages 1101 across the underlying communication bus and re-assembled at the receiving side. Message identifier field 1104(*a*)(2) includes message set identifier 1104(*a*)(2)(i) and message identifier 1004(*a*)(2)(ii).

Message based communications have an inherent need to unambiguously distinguish what is being communicated. Messages passed over buses implementing prior art communications protocols (e.g., Class 2) typically use separate fields to indicate what data is being passed from the data itself. This allows the receiving node to first determine the type of the rest of the data by using a message-generic algorithm to look at a fixed-formatted field, and then to send the rest of the data to the appropriate message-specific algorithm for decoding.

A problem with typical communications protocols in the automotive environment is the tradeoff between two conflicting needs. First, various users of the communications protocols have unique applications and need to define new messages to convey information to meet their unique applications. Secondly, because current communications protocols only have a finite number of individual messages which can be defined, the availability of message identifiers that can be allocated is limited. These two conflicting needs result in competition for a limited resource and causes different user groups to use the same message identifiers to define their messages. This practice undoubtedly leads to message collision on the communication buses and consequent data transmission errors. Further, if user groups are not somehow restricted in their respective allocation of new messages, it is possible for messages to be wasted when the user groups define redundant and/or unnecessary messages. This unrestricted allocation of messages eventually leads to the complete depletion of message identifiers.

One known solution for solving these problems is to establish a central managing committee which controls the definition of new messages and the assignment of message identifiers. Such a managing committee takes care of avoiding redundancy and waste, and generally puts pressure back on the user groups to limit new message definition in order to avoid running out of message identifiers. This solution is troublesome because it relies on one controlling body, which significantly slows down the process of defining new messages. The use of a managing committee may also lead to restrictions on the defined messages. For example, while two different original equipment manufacturers ("OEMs") may request that a message be defined for use on the CAN bus (i.e., one message for each OEM), the central managing committee may decide to only define one message to be used by both OEMs, and that message may be a generalized version of the messages separately requested by each OEM. Thus, the OEMs are forced to use a message that does not necessarily meet all of their respective needs.

The message identifier resolution method of the present invention enables an infinite number of messages to be defined globally by providing for infinite sets of messages that reuse message identifiers. The implementation of abstraction layer module 930 (FIG. 10) in each of the nodes of network 100 in conjunction with the use of message structure 1101 and the message resolution method of the present invention enables each node of network 100 to implement 2^8 message set identifiers and 2^8 message identifiers per message set identifier, which provides for 2^16 messages. Furthermore, 2^16 messages per node can be different messages, and network 100 may have n^16 messages where n is the number of nodes.

Figure 14A:
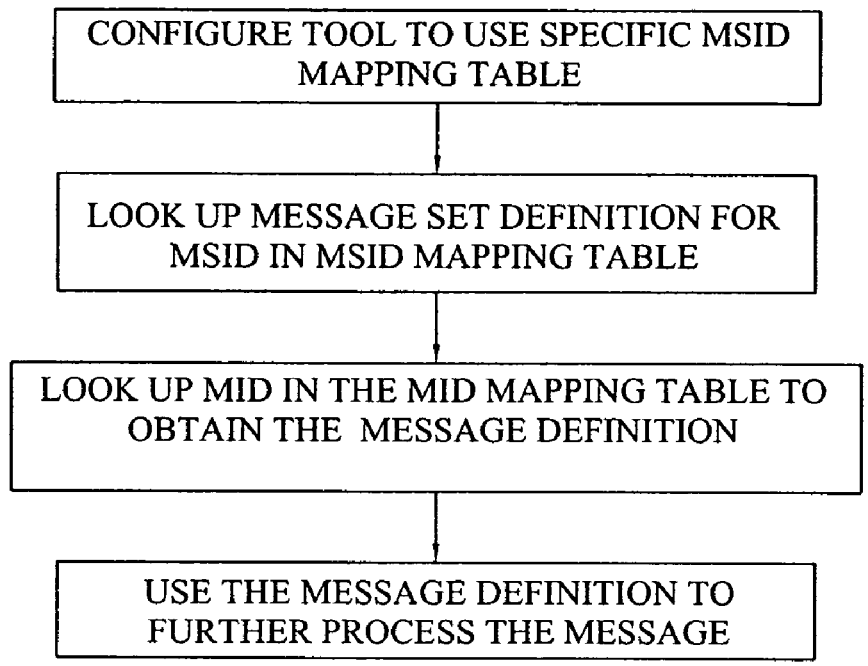
FIG. 14A is a flow chart of the message identifier resolution method of the present invention from a node-generic diagnostic tool perspective.
Figure 14B:
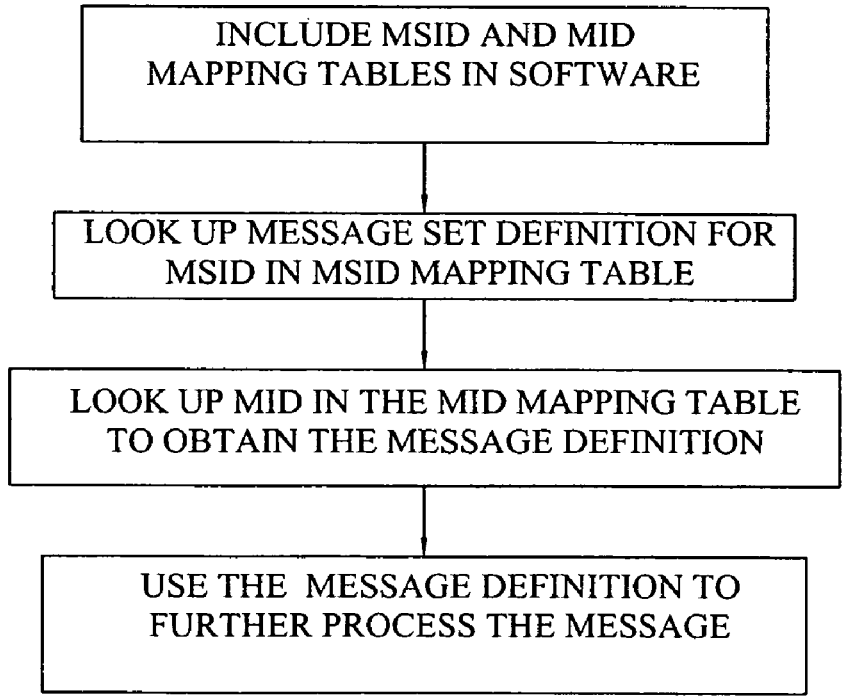
FIG. 14B is a flow chart of the message identifier resolution method of the present invention from a node-generic software architecture perspective.

As illustrated in the flowcharts of FIGS. 14A and 14B, the message resolution method of the present invention is used to interpret message 1101. The message resolution has two aspects—the resolving of message 1101 by configurable nodes typically outside the device being diagnosed (e.g. diagnostic tool 132, gas pump 152 diagnostic application) and the resolving of message 1101 by non-configurable nodes typically inside the device being diagnosed (e.g. ECM node 121, radio node 142). FIG. 14A is a flow chart illustrating the message resolution method of the present invention from the diagnostic tool perspective. As shown in this example, the method includes the steps of:

(1) configuring the tool to use a specific MSID mapping table (FIGS. 15A and 15B);

(2) looking up the message set definition for MSID 1104(*a*)(2)(i) in the MSID mapping table;

(3) looking up MID 1104(*a*)(2)(ii) in the MID mapping table to obtain the message definition; and (4) using the message definition of message 1101 to further process abstracted payload 1104*b*.

FIG. 14B is a flow chart of the message resolution method of the present invention from the diagnosed node software perspective. The method includes the steps of:

(1) designing the software to include the MSID mapping table and message set definition mapping tables for each of the message set definitions (FIGS. 15 and 16);

(2) looking up the message set definition for MSID 1104(*a*)(2)(*i*) in the MSID mapping table (FIGS. 15A and 15B);

(3) looking up MID 1104(*a*)(2)(*ii*) in the MID mapping table (FIGS. 16A and 16B) to obtain the message definition; and (5) using the message definition to further process abstracted payload 1104(*b*) of message 1101.

The message resolution method of the present invention may be better understood by referring to the tables of FIGS. 15 and 16 in the context of the following example. Referring to the vehicle of vehicle network 100, the OEM building the vehicle may be "ABC OEM" and the supplier supplying ECM node 121 and radio node 142 may be "DEF Supplier." ABC OEM supplies model names "123 ECM" and "456 Radio" to distinguish between other models of ECMs and radios that ABC OEM sells. Shown in FIGS. 15 and 16, MSIDs 0-256 may be established by any entity, e.g., ISO or the DEF Supplier, and MIDs 0-256 may be established by different standards groups. MSIDs 0-256 allow one or more of the MSIDs to be assigned a global definition common to all of the nodes. For example, MSID 0 may be assigned self discovery protocol messages definition 1500(*a*)(1) and MSID 1 may be assigned abstracted gateway protocol messages definition 1500(*a*)(2), thereby allowing the self discovery and gateway protocol messages to be communicated to and interpreted the same by all of the nodes in network 100. Each node in network 100 thereby identifies MSID 0 with abstracted self discovery protocol messages and MSID 1 with abstracted gateway protocol messages.

MSIDs may also be mapped to node-specific message sets for each node. This enables the meaning of MSIDs to vary from node to node on vehicle communication network 100 without conflict. In FIGS. 15A and 15B, the same message sets may be mapped to different MSIDs without the loss of functionality.

The following three-part example best illustrates the message resolution points described above. Abstraction header 1104*a* of a message may contain MSID:MID '17:03'. In FIG. 15A, the message resolution software of ECM node 121 is designed to include the MSID mapping table of FIG. 15A as well as MID mapping tables for each of the message set definitions 1500(*a*)(1)-1500(*a*)(14). Other known means of maintaining the MSID and MID mapping information may be used by the software in lieu of tables.

The software of ECM node 121 first consumes the '17' of the abstraction header 1104a and looks up MSID 17 in the MSID mapping table for ECM node 121 (FIG. 15A) to see that the message set definition is "CARB Standard XYZ Messages" 1500(a)(6). Because the message set definition is "CARB Standard XYZ Messages," the software knows to look up the MID in the "CARB Standard XYZ Messages" MID mapping table of FIG. 16A. While this example uses names to associate the message set definition with the appropriate MID mapping table, other identifiers may be used, e.g, alphabetic/numeric codes or the like. The software next consumes the '03' of the abstracted payload and looks up MID 03 in the MID mapping table to obtain the message definition. In this case, MID 03 has a message definition of "Set Last Service Date=' . . . '" and the software interprets the abstracted payload 1104b based on that message definition.

The same abstraction header 1004a containing MSID:MID '17:03' may be resolved by the message resolution software of radio node 142 as well. Referring to FIG. 15B, the software of radio node 142 is designed to include the mapping tables of FIGS. 15B and 16B. The software first consumes the '17' of the abstraction header 1104a and looks up MSID 17 in the MSID mapping table for radio node 142 (FIG. 15B) to obtain the "DEF Supplier Standard Manufacturing Test Messages" 1500(b)(6) message definition. Since the message set definition is "DEF Supplier Standard Manufacturing Test Messages," the software knows to look up the MID in the MID mapping table for message set "DEF Supplier Standard Manufacturing Test Messages" (FIG. 16A). The software next consumes the '03' of the abstraction header 1104a and looks up MID 03 in the MID mapping table of FIG. 16B to obtain the message definition. In this case, MID 03 has a message definition of "Set Model Number=' . . . '" and the software interprets the abstracted payload 1104b based on that message definition. Thus, as has been shown, both ECM node 121 and radio node 142 may resolve the same MSID:MID '17:03' to different messages, thereby avoiding the message conflict and central message definition body problems discussed herein to be avoided. This message resolution method also allows the definition of "infinite" messages globally.

In the third part of this example, an abstraction header 1104a containing MSID:MID '18:03' may be resolved the same way by the message resolution software of ECM node 121 and radio node 142. Referring to ECM node 121, node 121's software first consumes the '18' of abstraction header 1104a and looks up MSID 18 in the MSID mapping table for ECM node 121 (FIG. 15A) to see that the message set definition is "DEF Supplier Standard Manufacturing Test Messages" 1500(a)(7). The software then uses the "DEF Supplier Standard Manufacturing Test Messages" message set definition to look up the MID in the message set definition mapping table for that message set definition (FIG. 16B). The software next consumes the '03' of abstraction header 1104a and looks up MID 03 in the message set definition mapping table for the "DEF Supplier Standard Manufacturing Test Messages" message set to obtain the message definition. Accordingly, MID 03 has a message definition of "Set Model Number=' . . . '" and the software uses the message definition to branch to a function to handle abstracted payload 1104b.

Similarly, the software of radio node 142 also first consumes the '18' of abstraction header 1104a and looks up MSID 18 in the MSID mapping table for radio node 142 (FIG. 15B) to see that the message set definition is "DEF Supplier Standard Manufacturing Test Messages" 1600(b)(6). Next, using the "DEF Supplier Standard manufacturing Test Messages" message set definition, radio node's 142 software looks up the MID in the message set definition mapping table for the "DEF Supplier Standard manufacturing Test Messages" message set definition (FIG. 16B). The software then consumes the '03' of abstraction header 1004a and looks up MID 03 in the selected message set definition mapping table to determine the message definition. In this case, MID 03 has a message definition of "Set Model Number=' . . . '" and the software uses the message definition to branch to a function to handle abstracted payload 1104b. Therefore, because '18:03' is resolved the same way by ECM node 121 and radio node 142, message sets may be reused with the message resolution method of the present invention. Further, as has been shown by all three examples, a system implementing the method resolution method of the present invention may both have different message set mapping for some message sets from node to node and re-use other message sets in parallel. This accommodates both broad-scope message standardization and narrow-scope message customization without requiring centralized coordination of message definition.

Another benefit of the node-specific mapping feature is that it allows multiple scopes of definitions within each node. For example, referring to FIG. 15A, MSIDs are mapped to global message set identifiers 0 and 1 (i.e., "Abstracted Self Discovery Protocol Messages" and "Abstracted Gateway Protocol Messages."); governmental standards message set definitions are mapped to MSID 17 (i.e., "CARB Standard XYZ Messages); supplier standards message set definitions are mapped to MSIDs 18, 19 and 20 (i.e., "DEF Supplier Standard Manufacturing Test Messages," DEF Supplier ECM Standard Manufacturing Test Messages" and DEF Supplier ECM 123 Product Manufacturing Test Messages"); and OEM standards message set definitions are mapped to MSIDs 21 and 22 (i.e., "ABC OEM Standard Manufacturing Test Messages" and "ABC OEM ECM 123 Product Manufacturing Test Messages"). Even though different groups create and maintain each of the above-mentioned global, governmental, supplier and OEM standards, the groups do not have to coordinate directly between themselves or indirectly through a coordinating third party to avoid conflict or efficiently assign MIDs. Each group can define their standards completely independent of one another, and it is left up to the product engineers on the final products to simply map in the standards needed by that product.

Figure 17:
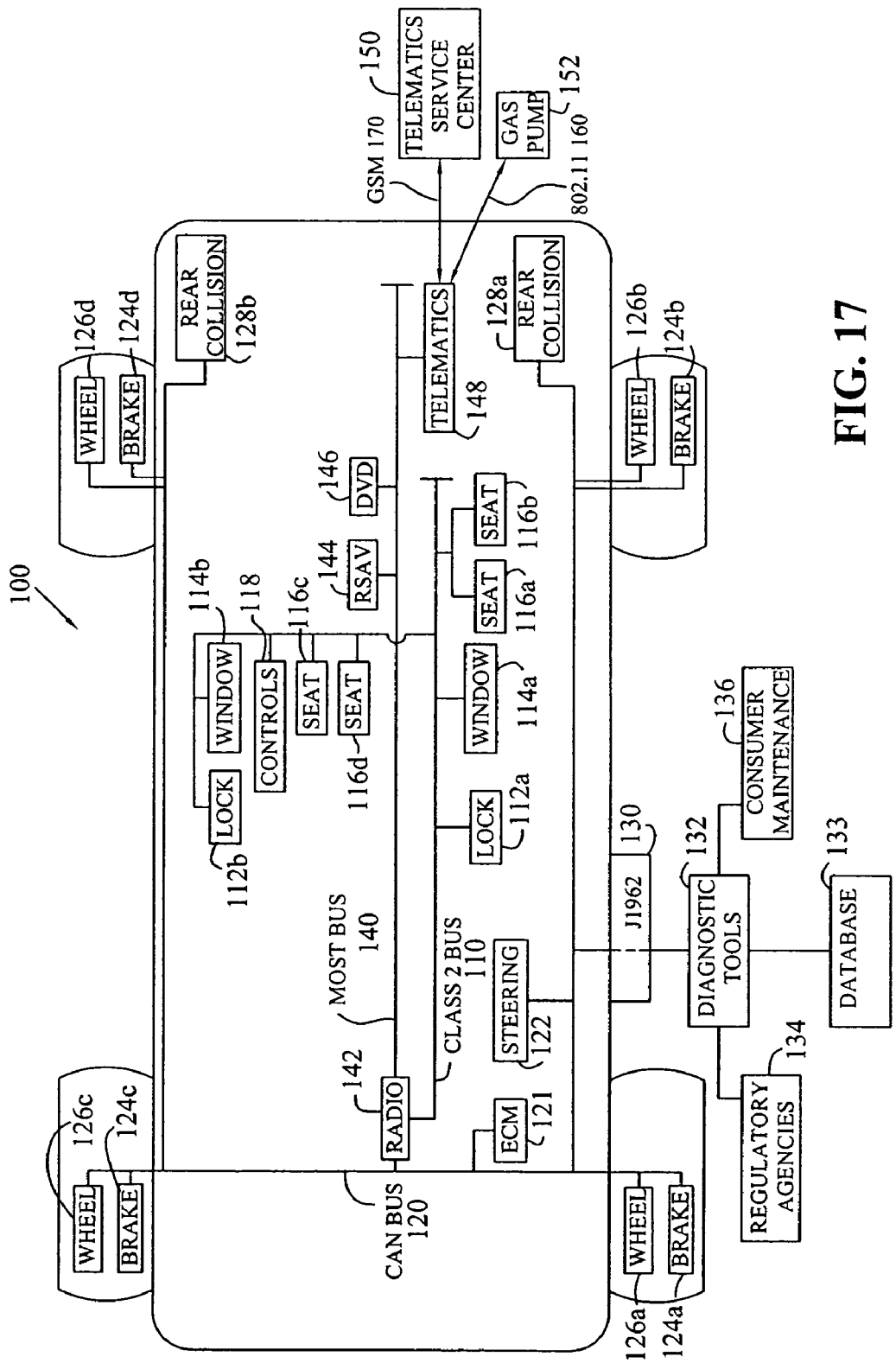
FIG. 17 is a perspective view of a prior art vehicle communication network, wherein the diagnostic tool node is in communication with a database for the resolution of message set identifier mapping.

A database may be used to maintain the tables and their mapping to devices as illustrated in FIGS. 15 and 16. Table 15A is mapped to ECM node 123 and table 15B is mapped to radio node 142. Shown in FIG. 17, diagnostic tool 132 may be in communication with database 133. A person operating diagnostic tool 132 may manually configure tool 132 such that tool 132 is aware that it is going to communicate with ECM node 121 and must use the mapping in the table of FIG. 15A. However, a global standard may be defined for use by diagnostic tool 132 that ask the nodes of vehicle network 100 what their respective mappings are, and diagnostic tool 132 may then auto-configure itself to map MSIDs accordingly depending on the node to which it is talking. The protocol to exchange the mapping information may include the exchange of a unique database identifier (e.g., a database key associated with the map). A global standard may also be assigned that defines messages to look up the mapping of specific standards in each node by unique identifier (e.g., a registered standard identifier or a registered standard name assigned by a central coordinating body). For example, a message exchange may allow diagnostic tool 132 to determine that standard "Standard A" is mapped to MSID 92 in ECM node 121 and mapped to MSID 55 in radio node 142.

In other embodiments, the diagnostic tool 132 may simply download the mappings for a node from the node itself via a protocol running on top of abstraction layer 930. Diagnostic tool 132 may then use the downloaded mappings to configure itself to communicate with a specific node in the network.

Figure 18:
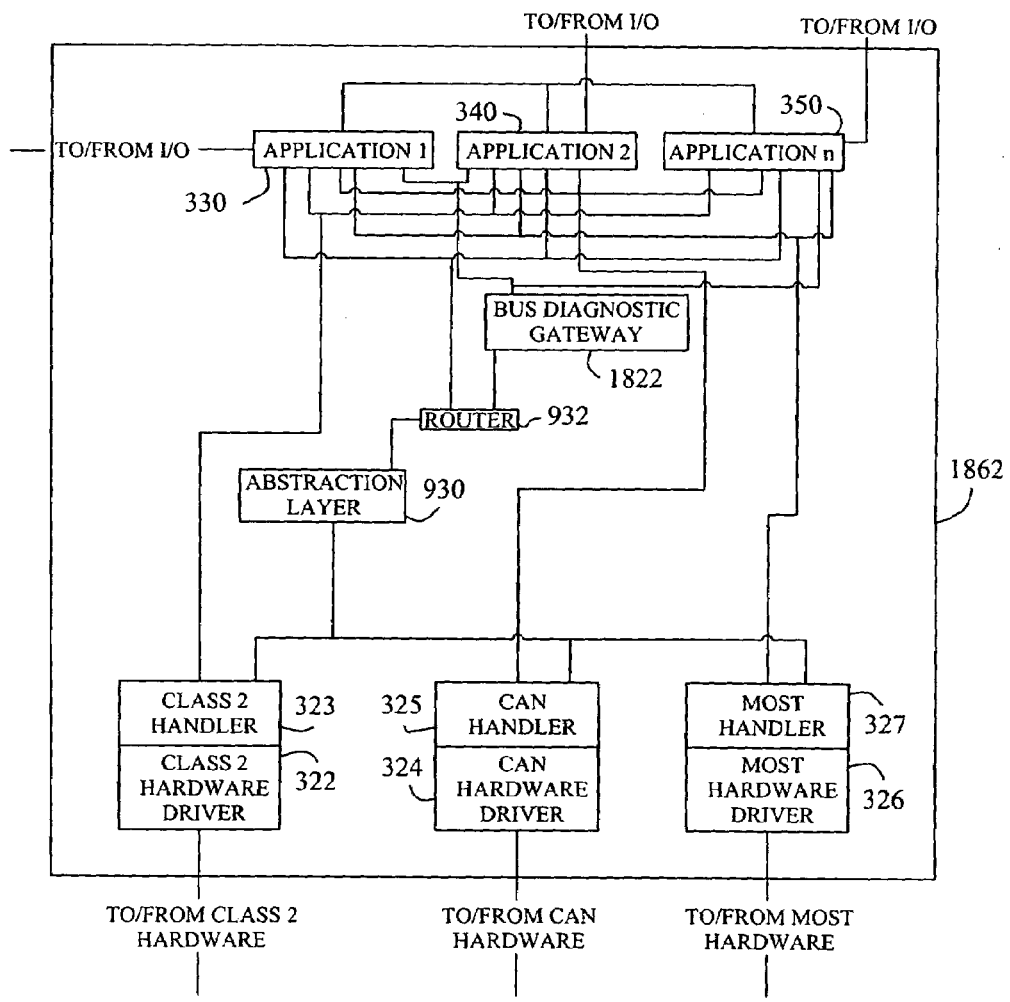
FIG. 18 is a perspective view of a software architecture for use in the processor of FIG. 2B, the software architecture implementing the abstraction layer and bus-agnostic gateway of the present invention.

The present invention further provides an abstraction gateway that may be implemented in every node of vehicle communication network 100. Shown in FIG. 18 is software architecture 1862 of a node connected to multiple communication buses and implementing abstraction layer 930 of the present invention. Software architecture 1062 may be used in processor 242a of radio node 142 of vehicle network 100 (FIG. 1). Software architecture 1062 may also be used in either one or both of processors 243a, 243b of the version of radio node 142 shown in FIG. 2C. Each of handlers 323, 325, 327 connect to abstraction layer 930, and abstraction layer 930 connects to router 932 and zero or more device-specific applications 330, 340, 350. Router 932 communicates with bus-agnostic gateway 1822 and at least one of applications 330, 340, 350. Bus-agnostic gateway 1822 connects to zero or more applications 330, 340, 350, and because abstraction layer 930 may be implemented in each of the nodes of vehicle communication network 100, bus-agnostic gateway 1822 may be implemented on top of abstraction layer 930 in an identical fashion in each of the nodes as well.

Whereas prior art software architectures used in the nodes providing full gateway functionality between multiple communication buses of a vehicle communication network necessarily contain multiple gateways (e.g., software architecture 410 of FIG. 4), a software architecture implementing bus-agnostic gateway 1822 on top of abstraction layer 930 only requires bus-agnostic gateway 1822. Indeed, a node in vehicle network 100 may use bus-agnostic gateway module 1822 to gateway between an arbitrary number of busses regardless of the number of buses in network 100 if that node is shared by every communication bus in network 100. Accordingly, referring to FIG. 1, bus-agnostic gateway 1822 enables information in a node of vehicle network 100 to be accessed from any of diagnostic tool 132, telematics service center 150 and gas pump 152 via any number of gateway hops and any number of connecting buses via a single solution. For this reason, the engineering effort required to implement software architecture 1862 is constant both regardless of the numbers of diagnosing entities, gateway hops and connecting buses within network 100 and regardless of the number of nodes in network 100 implementing software architecture 1862. Furthermore, software architecture 1862 is forward-compatible to future design changes made to tools used by external entities to access vehicle communication network 100.

When used in conjunction with known self-discovery protocols, the above-described message sets, message set resolution method, abstraction module and bus-agnostic gateway module of the present invention together provide a way to diagnose a remote node consisting of a network of sub-nodes of arbitrary complexity without a priori knowledge of the network construction and node capability. The use of the term "self discovery" in reference to the present invention refers to network query/response protocols that enable each node on vehicle communication network 100 to multicast its presence to the other nodes on network 100 across each of the various communication buses. Such protocols also enable each node to discover the identities, locations and configuration of the other nodes on network 100 as well as compute the paths to those nodes.

This solution is better understood in a byte-by-byte example of the transmission of a diagnostic message from telematics service center node 150 of vehicle communication network 100 to ECM node 121. As shown in FIG. 1, telematics service center node 150 is on GSM bus 170 and ECM node 121 is coupled to CAN bus 120. Each of telematics service center node 150, telematics node 148, radio node 142 and ECM node 121 contain abstraction layer 930 and bus-agnostic gateway 1822 implemented on top of abstraction layer 930.

In an exemplary embodiment of the present invention, each of GSM bus 170, MOST bus 140 and CAN bus 120 have a message allocated for carrying the abstraction layer of the present invention. Abstraction layer 930 and bus-agnostic gateway 1822 are of identical implementation across all of nodes 150, 148, 142, 121. Abstraction layer 930 of telematics service center 150 is connected to GSM handler 1903, abstraction layer 930 of telematics node 148 is connected to GSM handler 1903 and MOST handler 327, abstraction layer 930 of radio node 142 is connected to MOST handler 327, Class 2 handler 323 and CAN handler 325, and abstraction layer 930 of ECM node 121 is connected to CAN handler 325. Abstraction layer 930 of terminal nodes 150, 121 are also in communication with respective applications 1904, 1906 that send and receive the transmitted message.

For the purposes of the example message transmission to be described, the fictitious protocols of GSM bus 170, MOST bus 140 and CAN bus 120 are defined in the following simplified fashion:

GSM bus 170:
    Byte 1—Address
        Value 05=Telematics Service Center 150
        Value 03=Telematics node 148
    Byte 2—MID
        Value 62=abstracted message
        Others=normal communication bus data
    Byte 2 . . . n
        Payload MOST bus 140:
    Byte 1-2—MID
        Value 73=abstracted message
        Others=normal communication bus data
    Byte 3-4—Address
        Value 99=Radio 142
        Value 77=Telematics node 148
    Byte 2 . . . n
        Payload CAN bus 120:
    Byte 1-3—Address
        Value 22=Radio 142
        Value 33=ECM node 121
    Byte 4-7—MID
        Value 42=abstracted message
        Others=normal communication bus data
    Byte 8 . . . 10
        Payload These fictitious protocols are used to simplify the below example and are not meant to be representative of true GSM, MOST and CAN protocols.

The following table is an illustrative example of the byte-by-byte description of the message transmission.

|  | From | | To | | | |
|---|---|---|---|---|---|---|
| Step # | Node | Module | Node | Module | Action | Message |
| 1 | 150 | Application 1904 | | | Application 1904 decides to send message | IN: not applicable OUT: 00 01 02 03 04 05 |
| 2 | 150 | Application 1904 | 150 | Bus-agnostic gateway 1822 | Application 1904 asks bus-agnostic gateway 1822 to send message to ECM node 121. ECM node 121 identification is in the form of an identifier obtained during self-discovery | IN: 00 01 02 03 04 05 OUT: 00 01 02 03 04 05 |
| 3 | 150 | Bus-agnostic gateway 1822 | | | Gateway 1822 looks up routing information for ECM node 121 based on self-discovery protocol. It determines that ECM node 121 is accessed via the path 23 42 75 | IN: 00 01 02 03 04 05 OUT: 00 01 02 03 04 05 |
| 4 | 150 | Bus-agnostic gateway 1822 | | | Gateway 1822 builds the diagnostic message containing both the path and the message itself. | IN: 00 01 02 03 04 05 OUT: 03 23 42 75 00 01 02 03 04 05 |
| 5 | 150 | Bus-agnostic gateway 1822 | 150 | Bus-agnostic gateway 1822 | Gateway 1822 forwards the diagnostic message internal to itself, to the portion of gateway 1822 which processes and routes incoming messages | IN: 03 23 42 75 00 01 02 03 04 05 OUT: 03 23 42 75 00 01 02 03 04 05 |

|  | From | | To | | | |
|---|---|---|---|---|---|---|
| Step # | Node | Module | Node | Module | Action | Message |
| 6 | 150 | Bus-agnostic gateway 1822 | | | Gateway 1822 consumes the first part of the routing information, which tells it that the destination is 23, which is node 148 on bus 170 based | IN: 00 01 02 03 04 05 OUT: 02 42 75 00 01 02 03 04 05 |

-continued

| Step # | From Node | From Module | To Node | To Module | Action | Message |
|---|---|---|---|---|---|---|
| | | | | | on the self-discovery protocol. Gateway 1822 then rebuilds the message with the first routing part stripped off. | |
| 7 | 150 | Bus-agnostic gateway 1822 | 150 | Abstraction layer 930 | Gateway 1822 sends the message to router 932, which routes the message to abstraction layer 930. Abstraction layer 930 indicates message 03:04 and node 3 on bus 170. | IN: 02 42 75 00 01 02 03 04 05 OUT: 02 42 75 00 01 02 03 04 05 |
| 8 | 150 | Abstraction layer 930 | 150 | GSM handler 1903 | Abstraction layer 930 adds the abstraction header 00 03 04 to the message, wraps it in bus 170 message 03 62, and sends it to GSM handler 1903. | IN: 02 42 75 00 01 02 03 04 05 OUT: 03 62 00 03 04 02 42 75 00 01 02 03 04 05 |
| 9 | 150 | GSM handler 1903 | 148 | GSM handler 1903 | The message goes across bus 170 from node 150 to node 148 in the communication-bus-specific way that messages are transmitted on bus 170. | IN: 03 62 00 03 04 02 42 75 00 01 02 03 04 05 OUT: 03 62 00 03 04 02 42 75 00 01 02 03 04 05 |

| Step # | From Node | From Module | To Node | To Module | Action | Message |
|---|---|---|---|---|---|---|
| 10 | 148 | GSM handler 1903 | 148 | Abstraction layer 930 | GSM handler 1903 sees the message on bus 170 and determines that it is the recipient of the message based on address 03. Handler 1903 further processes the message because MID is 62, which means it is an abstracted message. Handler 1903 then forwards bus 170 payload to abstraction layer 930. | IN: 00 03 04 02 42 75 00 01 02 03 04 05 OUT: 00 03 04 02 42 75 00 01 02 03 04 05 |

-continued

| Step # | From Node | Module | To Node | Module | Action | Message |
|---|---|---|---|---|---|---|
| 11 | 148 | Abstraction layer 930 | 148 | Bus-agnostic gateway 1822 | Abstraction layer 930 looks at the abstraction layer 00 03 04. It sees that it is a complete message based on the packetization bits (00), so forwards the abstracted payload to router 932, which processes the message, looking at its MSID 03 and MID 04. It sees that this is the reserved pair for gateway functionality, so it forwards the abstracted payload to bus-agnostic gateway 1822. | IN: 02 42 75 00 01 02 03 04 05 OUT: 02 42 75 00 01 02 03 04 05 |
| 12 | 148 | Bus-agnostic gateway 1822 | | | Bus-agnostic gateway 1822 looks at the received message's routing portion (02 42 75) and determines that routing is incomplete (not zero length). Thus, gateway 1822 consumes the first routing identifier (42) and rebuilds the message. It looks up the routing information for identifier 42 and determines that the destination is radio node 142 on MOST bus 140. | IN: 00 01 02 03 04 05 OUT: 01 75 00 01 02 03 04 05 |
| 13 | 148 | Bus-agnostic gateway 1822 | 148 | Abstraction layer 930 | Gateway 1822 sends the message to router 932, which routes the message to abstraction layer 930, indicating message 03:04 and node 99 on bus 140. | IN: 01 75 00 01 02 03 04 05 OUT: 01 75 00 01 02 03 04 05 |
| 14 | 148 | Abstraction layer 930 | 148 | MOST handler 327 | Abstraction layer 930 adds the abstraction layer 00 03 04 to the message, wraps it in a bus 140 message 00 73 00 99, and sends it to the MOST handler 327. | IN: 01 75 00 01 02 03 04 05 OUT: 00 73 00 99 00 03 04 01 75 00 01 02 03 04 05 |

|  | From | | To | | | |
|---|---|---|---|---|---|---|
| Step # | Node | Module | Node | Module | Action | Message |
| 15 | 148 | MOST handler 327 | 142 | MOST handler 327 | The message goes across bus 140 from node 148 to node 142 in the communication-bus-specific way that messages are transmitted on bus 140. | IN: 00 73 00 99 00 03 04 01 75 00 01 02 03 04 05 OUT: 00 73 00 99 00 03 04 01 75 00 01 02 03 04 05 |
| 16 | 142 | MOST handler 327 | 142 | Abstraction layer 930 | MOST handler 327 sees the message on bus 140 and determines that it is the recipient of the message based on address 00 99. Handler 327 further processes the message, seeing that the MID is 00 73, which means it is an abstracted message. Handler 327 thus forwards bus 140 payload to abstraction layer 930. | IN: 00 03 04 01 75 00 01 02 03 04 05 OUT: 00 03 04 01 75 00 01 02 03 04 05 |
| 17 | 142 | Abstraction layer 930 | 142 | Bus-agnostic gateway 1822 | Abstraction layer 930 looks at the abstraction layer 00 03 04. It sees that it is a complete message based on the packetization bits (00), so it forwards the abstracted payload to router 932, which processes the message, looking at its MSID 03 and MID 04. It sees that this is the reserved pair for gateway functionality, so it forwards the abstracted payload to bus-agnostic gateway 1822. | IN: 01 75 00 01 02 03 04 05 OUT: 01 75 00 01 02 03 04 05 |
| 18 | 142 | Bus-agnostic gateway 1822 | | | Gateway 1822 looks at the routing information in the message and determines routing is not done. It thus consumes the first routing identifier 75 and rebuilds the message. | IN: 00 01 02 03 04 05 OUT: 00 00 01 02 03 04 05 |

-continued

| | From | | To | | | |
|---|---|---|---|---|---|---|
| Step # | Node | Module | Node | Module | Action | Message |
| 19 | 142 | Bus-agnostic gateway 1822 | 142 | Abstraction layer 930 | Gateway 1822 then determines that the routing identifier corresponds to ECM node 121 on CAN bus 120. Gateway 1822 forwards the message to router 932, which forwards the message to abstraction layer 930, indicating MSID:MID 03:04, and node 33 of CAN bus 120. | IN: 00 00 01 02 03 04 05 OUT: 00 00 00 01 02 03 04 05 |

| | From | | To | | | |
|---|---|---|---|---|---|---|
| Step # | Node | Module | Node | Module | Action | Message |
| 20 | 142 | Abstraction layer 930 | 142 | CAN handler 325 | Abstraction layer 930 adds the abstraction layer. Since the whole abstracted message does not fit in a CAN message, packetization is triggered. Packetization codes are shown as FIRST, MIDDLE, LAST. Abstraction layer 930 then adds the communication bus wrapper to each message, and forwards the messages to CAN handler 325 | IN: 00 00 01 02 03 04 05 OUT: 00 00 00 33 00 00 00 42 40 03 04 00 00 00 33 00 00 00 42 90 00 00 00 00 00 33 00 00 00 42 A0 01 02 00 00 00 33 00 00 00 42 B0 03 04 00 00 00 33 00 00 00 42 C0 05 |
| 21 | 142 | CAN handler 325 | 121 | CAN handler 325 | CAN handler 325 forwards the series of messages across CAN bus 120 to CAN handler 325 of ECM node 121. | IN: 00 00 00 33 00 00 00 42 40 03 04 00 00 00 33 00 00 00 42 90 00 00 00 00 00 33 00 00 00 42 A0 01 02 00 00 00 33 00 00 00 42 B0 03 04 00 00 00 33 00 00 |

|  | From | | To | | | |
|---|---|---|---|---|---|---|
| Step # | Node | Module | Node | Module | Action | Message |
| | | | | | | 00 42 C0 05<br>OUT: 00 00 00 33 00 00 00 42 40 03 04 00 00 00 33 00 00 00 42 90 00 00 00 00 00 33 00 00 00 42 A0 01 02 00 00 00 33 00 00 00 42 B0 03 04 00 00 00 33 00 00 00 42 C0 05 |
| 22 | 121 | CAN handler 325 | 121 | Abstraction layer 930 | CAN handler 325 receives a series of messages. In the order received, it determines each is destined for ECM node 121, and each is an abstracted message, so it forwards the CAN bus 120 payload of each message to abstraction layer 930. | IN:<br>40 03 04 90 00 00 A0 01 12 B0 03 04 C0 05<br>OUT: 40 03 04 90 00 00 A0 01 02 B0 03 04 C0 05 |

|  | From | | To | | | |
|---|---|---|---|---|---|---|
| Step # | Node | Module | Node | Module | Action | Message |
| 24 | 121 | Abstraction layer 930 | 121 | Bus-agnostic gateway 1822 | Abstraction layer 930 looks at the abstraction layer 00 03 04. It sees that it is a complete message based on the packetization bits (00), so forwards the abstracted payload to router 932, which processes the message, looking at its MSID 03 and MID 04. It sees that this is the reserved pair | IN:<br>00 00 01 02 03 04 05<br>OUT:<br>00 00 01 02 03 04 05 |

-continued

| Step # | From Node | Module | To Node | Module | Action | Message |
|---|---|---|---|---|---|---|
| 25 | 121 | Bus-agnostic gateway 1822 | 121 | Router 932 | for gateway functionality, so it forwards the abstracted payload to bus-agnostic gateway 1822. Gateway 1822 sees that the routing information is zero length, which means the message has reached its destination. Gateway 1822 thus sends the payload to router 932 with instructions to send the message to the local consumers. | IN: 00 00 01 02 03 04 05 OUT: 00 01 02 03 04 05 |

| Step # | From Node | Module | To Node | Module | Action | Message |
|---|---|---|---|---|---|---|
| 26 | 121 | Router 932 | 121 | Application 1906 | Router 932 forwards the message to end application 1906. | IN: 00 01 02 03 04 05 OUT: 00 01 02 03 04 05 |

Figure 19:
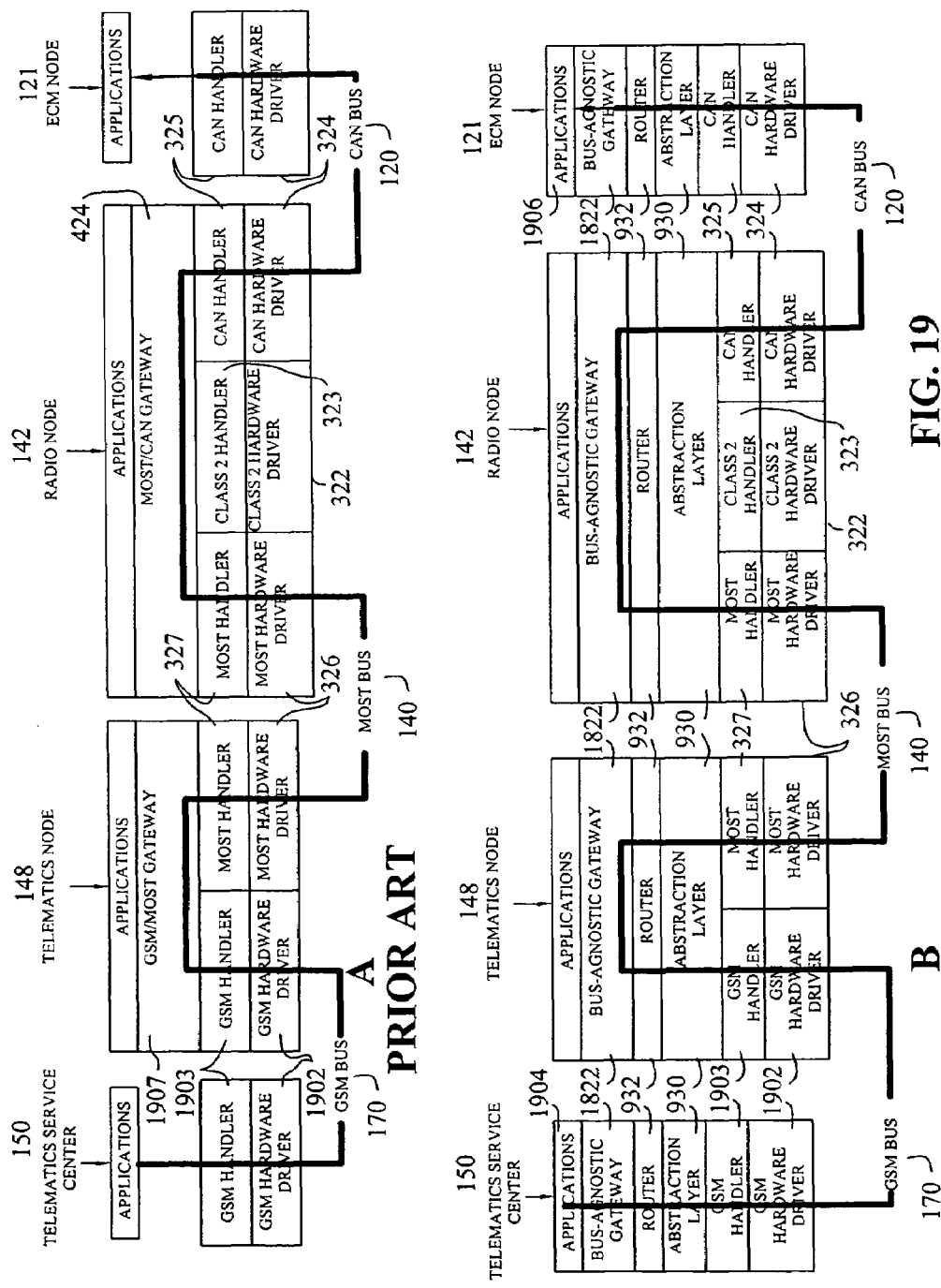
FIG. 19A is a diagram illustrating the prior art transmission of a message from the telematics service center to the ECM node of the vehicle communication network of FIG. 1.
FIG. 19B is a diagram illustrating the transmission of a message from the telematics service center to the ECM node of the vehicle communication network of FIG. 1 when the telematics service center, radio node, telematics node and ECM node implement the abstraction layer and bus-agnostic gateway module of FIG. 18.

The benefit of bus agnostic gateway module 1822 is clearly shown in FIGS. 4 and 19. In FIG. 19A, telematics node 148 and radio node 142 have prior art gateway features. Accordingly, telematics node 148 must implement GSM/MOST gateway 1907 and CAN/MOST gateway 424 (FIG. 4). However, telematics node 148 and radio node 142 of FIG. 19B may both implement bus-agnostic gateway 1822 in the same way on top of abstraction layer 930 to provide the same gateway functionalities provided by the multiple gateways in FIG. 19A in a more efficient manner. Bus-agnostic gateway 1822 also may be implemented in many other gateway nodes in a vehicle communication network to enable full-vehicle diagnostics to be performed with the single solution of bus-agnostic gateway 1822.

Additionally, the following problems discussed herein are solved with the implementation of bus-agnostic gateway 1822:

the centralized management of new message definitions requiring coordination in the assignment of type identifiers the inability to do indirect network diagnostics through gateways in a consistent and efficient fashion the requirement that new messages be defined for transmission on a communication bus different from the bus to which the node originating the message is connected the definition of an extraordinary number of messages to solve the problem above the flooding of communication buses with messages when tunneling without filtering is used the frequent updating of node software when tunneling with filtering is used While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

I claim:

1. In a network including multiple computer devices coupled to at least one communication bus utilizing a communication bus protocol, a computer device comprising:

at least one hardware circuitry connected to the at least one communication bus; and at least one microprocessor connected to said at least one hardware circuitry, said at least one microprocessor containing software having an architecture including:

communication software capable of communicating with the at least one communication bus; and an abstraction layer in communication with said communication software, said abstraction layer capable of abstracting a message from the communication bus protocol, wherein said abstraction layer implements a protocol that enables at least one layer above said abstraction layer to be defined without regard to underlying layer implementations, such that said message is communicated over said at least one communication bus implementing any of a plurality of communication bus protocols.

2. The computer device of claim 1 further including a second microprocessor connected to said at least one microprocessor, said second microprocessor containing software having said architecture.

3. The computer device of claim 2 wherein said second microprocessor is connected to a second hardware circuitry.

4. The computer device of claim 1 wherein said at least one microprocessor contains software having said architecture including a gateway in one of direct and indirect communication with said abstraction layer and capable of routing the abstracted message.

5. The computer device of claim 4 wherein said at least one microprocessor contains software having said architecture including said gateway, wherein said gateway uses a self-discovery protocol to gather data descriptive of the network's layout.

6. The computer device of claim 4 wherein said at least one microprocessor contains software having said architecture further including at least one application program in communication with said gateway.

7. The computer device of claim 6 wherein said at least one microprocessor includes memory containing software having said architecture including said at least one application program, wherein said at least one application program is in indirect communication with said abstraction layer.

8. The computer device of claim 1 wherein said at least one microprocessor contains software having said architecture include communication software having a driver for controlling said at least one hardware circuitry.

9. The computer device of claim 5 wherein said at least one microprocessor contains software having said architecture including said communication software having a handler in communication with said driver.

10. The computer device of claim 1 wherein said at least one microprocessor contains software having said architecture including said abstraction layer, wherein said abstraction layer includes a router.

11. In a network including a plurality of nodes between which at least one message may be communicated, a method of enabling the nodes to resolve the message, the message including a message set ID and a message ID, said method comprising the steps of:
looking up the message set ID in a message set ID mapping, which maps at least one message set ID to a message set definition for each node, to obtain the message set definition;
looking up the message ID in a message ID mapping, which maps at least one message ID to a message definition, to obtain the message definition; and
using the message definition to interpret the message.

12. The method of claim 11 further including a step of storing the message set ID mapping and the message ID mapping in a database.

13. The method of claim 12 further including a step of extracting the message set ID mapping and the message ID mapping from the database to a configurable node, wherein the message set ID and the message ID mappings are used to configure the configurable node such that the configurable node may use the message set ID mapping and the message ID mapping in communicating with a specific node in the network.

14. The method of claim 11 further comprising a step of downloading the message set ID mapping and the message ID mapping from at least one node to a configurable node, wherein the message set ID mapping and the message ID mapping are used to configure the configurable node, thereby enabling the configurable node to communicate with a specific node in the network.

15. A network comprising:
at least one communication bus utilizing one communication bus protocol of a plurality of communication bus protocols; and
a plurality of computer devices coupled to said at least one communication bus, at least one of said plurality of computer devices containing computer device software having an architecture including:
communication software for communicating with said at least one communication bus; and
an abstraction layer in communication with said communication software and capable of abstracting a message from the communication bus protocol, wherein said abstraction layer implements a protocol that enables at least one layer above said abstraction layer to be defined without regard to underlying layer implementations, such that said message is communicated over said at least one communication bus implementing any of a plurality of communication bus protocols.

16. The network of claim 15 wherein at least one of said plurality of computer devices contains computer device software having an architecture including a gateway in one of direct and indirect communication with the abstraction layer and capable of routing the abstracted message.

17. The network of claim 16 wherein at least one of said plurality of computer devices contain computer device software having the architecture including a router in communication with the abstraction layer and the gateway.

18. The network of claim 16 wherein at least one of said plurality of computer devices contain computer device software having the architecture including the gateway, wherein the gateway uses a self-discovery protocol to gather data descriptive of the network's layout.

19. The network of claim 15 wherein at least one of said plurality of computer devices contain computer device software having the architecture including the abstraction layer, wherein the abstracting layer is capable of abstracting the message, the message having a message set ID and a message ID.

20. The network of claim 19 wherein at least one of said plurality of computer devices contain computer device software including a message set ID mapping, which maps at least one message set ID to a message set definition for that computer device, and a message ID mapping for each message set definition, which maps at least one message ID to a message definition.

21. The network of claim 20 wherein at least one of said plurality of computer devices resolves the abstracted message by carrying out the steps of:
looking up the message set ID in the message set ID mapping to obtain the message set definition
looking up the message ID in the message ID mapping to obtain the message definition; and
using the message definition to interpret the abstracted message.

22. A network comprising:
a plurality of communication buses, at least two of the plurality of buses utilizing different communication bus protocols;
a plurality of computer devices, at least one of said plurality of computer devices coupled to at least one of said plurality of communication buses and containing computer device software having an architecture including:

bus communication software for communicating with at least one of said plurality of communication buses; and an abstraction layer in communication with said bus communication software and capable of abstracting messages from the communication bus protocols, said plurality of computer devices including at least one gateway computer device coupled to multiple ones of said plurality of communication buses and containing computer device software having an architecture further including a gateway in communication with the abstraction layer and capable of routing the abstracted messages between computer devices coupled to the multiple communication buses to which the gateway computer device is coupled.

23. The network of claim 22 wherein at least one of said plurality of computer devices contain computer device software having the architecture including a router in communication with the abstraction layer and the gateway.

24. The network of claim 23 wherein at least one of said plurality of computer devices contain computer device software having the architecture including the gateway, wherein the gateway uses a self-discovery protocol to gather data descriptive of the network's layout.

25. The network of claim 23 wherein at least one of said plurality of computer devices contain computer device software having the architecture including the abstraction layer, wherein the abstraction layer is capable of abstracting the message from the communication bus protocols, the message having a message set ID and a message ID.

26. The network of claim 25 wherein at least one of said plurality of computer devices contain computer device software including a message set ID mapping, which maps at least one message set ID to a message set definition for that computer device, and a message ID mapping for each message set definition, which maps at least one message ID to a message definition.

27. The network of claim 26 wherein at least one of said plurality of computer devices resolves the abstracted message by carrying out the steps of:
    looking up the message set ID in the message set ID mapping to obtain the message set definition;
    looking up the message ID in the message ID mapping to obtain the message definition; and
    using the message definition to interpret the abstracted message.

28. The network of claim 22, wherein said abstraction layer implements a protocol that enables at least one layer above said abstraction layer to be defined without regard to underlying layer implementations, such that said message is communicated over said at least one communication bus implementing any of a plurality of communication bus protocols.

29. In a network including multiple computer devices coupled to at least one communication bus utilizing a communication bus protocol, a computer device comprising:
    at least one hardware circuitry connected to the at least one communication bus; and
    multiple microprocessors connected to said at least one hardware circuitry and containing software having an architecture including:
    communication software capable of communicating with the at least one communication bus; and
    an abstraction layer in communication with said communication software, said abstraction layer capable of abstracting a message from the communication bus protocol, wherein said abstraction layer implements a protocol that enables at least one layer above said abstraction layer to be defined without regard to underlying layer implementations, such that said message is communicated over said at least one communication bus implementing any of a plurality of communication bus protocols.

30. The computer device of claim 29 wherein the gateway uses a self-discovery protocol to gather data descriptive of the network's layout.

31. The computer device of claim 29 wherein the abstraction layer is capable of abstracting the message from the communication bus protocols, the message having a message set ID and a message ID.

32. The computer device of claim 31 wherein said computer device contains computer device software including a message set ID mapping, which maps at least one message set ID to a message set definition for that computer device, and a message ID mapping for each message set definition, which maps at least one message ID to a message definition.

33. The computer device of claim 32 wherein said computer device resolves the abstracted message by carrying out the steps of:
    looking up the message set ID in the message set ID mapping to obtain the message set definition
    looking up the message ID in the message ID mapping to obtain the message definition; and
    using the message definition to interpret the abstracted message.

34. A method of communicating a message over a network, said method comprising the steps of:
    providing at least one communication bus having a plurality of layers;
    supporting transport layer functions on a transport layer of said plurality of layers, wherein said transport layer functions are compatible with a communication bus protocol of said at least one communication bus over which a message is communicated; and
    abstracting said message from said communication bus protocol by an abstraction layer of said plurality of layers in communication with the transport layer, wherein said abstraction layer implements a protocol that enables said layers above said abstraction layer to be defined without regard to underlying layer implementations, such that said message is communicated over said at least one communication bus implementing any of a plurality of communication bus protocols.

35. The method of claim 34 further comprising the step of providing a lower portion in communication with said transparent layer, and supporting at least one of a physical layer function, a data link layer function, and a network layer function.

36. The method of claim 34 further comprising the step of providing a first upper portion in communication with said abstraction layer, and a second upper portion in communication with said transport layer, wherein said first and second upper portions support at least one of a session layer function, a presentation layer function, and an application layer function.

37. The method of claim 34, wherein said abstraction layer comprises a header.

38. The method of claim 37, wherein said header comprises packetization bits.

39. The method of claim 38, wherein said packetization bits include at least one of stage bits and counter bits.

40. The method of claim 37 further comprising the step of identifying said abstracted message by a message identifier included in said header.

41. The method of claim 40 further comprising the step of identifying a message set to which said abstracted message belongs by a message set identifier included in said message identifier.

42. The method of claim 41 further comprising the step of identifying said abstracted message within said message set by a sub-identifier included in said message identifier.

43. The method of claim 37, wherein said abstraction layer further comprises a payload field for transporting said abstracted message therein.

44. The method of claim 34 further comprising the step of providing a gateway portion in communication with said abstraction layer.

45. The method of claim 44 further comprising the step of providing a self-discovery portion in communication with said gateway portion, wherein said self-discovery portion gathers data descriptive of a network's layout.

46. A method of communicating a message, said method comprising the steps of:
providing a network comprising multiple computer devices coupled to at least one communication bus;
communicating a message over said at least one communication bus utilizing one of a plurality of communication bus protocols; and
abstracting said message from said communication bus protocol by an abstraction layer of said communication bus, wherein said abstraction layer implements a protocol that enables at least one layer of said communication bus above said abstraction layer to be defined without regard to layers of said communication bus that underlie said abstraction layer, such that said message is communicated over said communication bus implementing any of said plurality of communication bus protocols.

47. The method of claim 46 further comprising the step of communicating one of directly or indirectly between a gateway and said abstraction layer, wherein said gateway routes said abstracted message.

48. The method of claim 47 further comprising the step of providing a router in communication with said abstraction layer and said gateway.

49. The method of claim 47 further comprising the step of gathering data descriptive of said network's layout using a self-discovery protocol of said gateway.

50. The method of claim 47 further comprising the step of providing at least one application program in communication with said gateway.

51. The method of claim 50, wherein said at least one application program is in communication with a router.

52. The method of claim 46 further comprising the step of controlling circuitry by at least one driver that provides an interface to said at least one communication bus.

53. The method of claim 52 further comprising the step of providing at least one handler in communication with said at least one driver.

54. The method of claim 47 further comprising the step of defining said at least one layer of said communication bus above said abstraction layer to be defined without regard and in regard to layers of said communication bus that underlie said abstraction layer, such that said at least one layer of said communication bus above said abstraction layer communicates said message that is abstracted by said abstraction layer and a second message that is communicated in one of said plurality of protocols specific to said communication bus.

* * * * *